United States Patent
Nellums et al.

(10) Patent No.: US 9,989,137 B2
(45) Date of Patent: Jun. 5, 2018

(54) DIRECT DRIVE HYDROSTATIC TRANSMISSION

(71) Applicant: DANA ITALIA S.P.A., Arco (Trento) (IT)

(72) Inventors: Richard A. Nellums, Portage, MI (US); Luca Gilardino, Riva del Garda (IT); Giulio Ornella, Arco (IT); Nicola Tessaro, Arco (IT); Ettore Cosoli, Padua (IT); Lorenzo Serrao, Nago-Torbole (IT)

(73) Assignee: Dana Italia S.p.A., Arco (Trento) (IT)

( * ) Notice: Subject to any disclaimer, the term of this patent is extended or adjusted under 35 U.S.C. 154(b) by 243 days.

(21) Appl. No.: 14/392,097

(22) PCT Filed: Apr. 11, 2014

(86) PCT No.: PCT/EP2014/057451
§ 371 (c)(1),
(2) Date: Oct. 8, 2015

(87) PCT Pub. No.: WO2014/167130
PCT Pub. Date: Oct. 16, 2014

(65) Prior Publication Data
US 2016/0076633 A1    Mar. 17, 2016

Related U.S. Application Data

(60) Provisional application No. 61/811,581, filed on Apr. 12, 2013.

(51) Int. Cl.
*F16H 37/06*    (2006.01)
*F16H 47/02*    (2006.01)
(Continued)

(52) U.S. Cl.
CPC ............. *F16H 47/02* (2013.01); *B60K 17/10* (2013.01); *B60K 17/356* (2013.01); *F16H 2047/025* (2013.01)

(58) Field of Classification Search
CPC .... F16H 3/006; F16H 2003/007; F16H 39/00; F16H 2047/025
(Continued)

(56) References Cited

U.S. PATENT DOCUMENTS 4,667,536 A * 5/1987 Ehrlinger ............... B60K 17/04
                                                    180/53.2
5,946,983 A * 9/1999 Brambilla ............... F16H 47/02
                                                    180/307

(Continued)

FOREIGN PATENT DOCUMENTS

CN    101905648 A    12/2010
CN    101922542 A    12/2010
(Continued)

OTHER PUBLICATIONS

European Patent Office, International Search Report and Written Opinion, dated Jun. 17, 2014; 9 pages; European Patent Office; Rijswijk, Netherlands.

(Continued)

*Primary Examiner* — Ha Dinh Ho
(74) *Attorney, Agent, or Firm* — Marshall & Melhorn, LLC

(57) ABSTRACT

A hydrostatic driveline and method of operating a hydrostatic driveline is provided. The hydrostatic driveline comprises a power source, hydrostatic pump, a hydrostatic motor, a direct drive link, a first transmission portion, and a second transmission portion. The direct drive link is in driving engagement with at least one of the power source and the hydrostatic pump. The first transmission portion is in (Continued)

driving engagement with a vehicle output and the hydrostatic motor. The second transmission portion is in driving engagement with the direct drive link and at least one of the vehicle output and the first transmission portion. The hydrostatic pump, the hydrostatic motor, and the first transmission portion form a first power path for the hydrostatic driveline and the direct drive link and the second transmission portion form a second power path for the hydrostatic driveline.

11 Claims, 10 Drawing Sheets

(51) Int. Cl.
  *B60K 17/10* (2006.01)
  *B60K 17/356* (2006.01)
(58) Field of Classification Search
  USPC .................. 74/664, 665 R, 665 B, 665 A
  See application file for complete search history.

(56) References Cited

U.S. PATENT DOCUMENTS

| | | | |
|---|---|---|---|
| 6,044,728 A | 4/2000 | Pecceu | |
| 6,361,463 B1 | 3/2002 | Kojima | |
| 7,337,870 B2 * | 3/2008 | Izukura | F16H 59/06 180/307 |
| 7,465,245 B2 * | 12/2008 | Ripamonti | F16H 47/04 475/72 |
| 8,667,865 B2 | 3/2014 | Hoyle et al. | |
| 8,839,694 B2 | 9/2014 | Detrick et al. | |
| 9,494,222 B2 * | 11/2016 | Versteyhe | B60K 17/10 |

FOREIGN PATENT DOCUMENTS

| | | |
|---|---|---|
| DE | 19803510 A1 | 9/1999 |
| EP | 0896893 A2 | 2/1999 |
| JP | H02-221763 A | 9/1990 |
| WO | 2007010743 A1 | 1/2007 |

OTHER PUBLICATIONS

State Intellectual Property Office of the People's Republic of China; Notice on the First Office Action issued in parallel Chinese patent application No. 201480033474.4; dated May 4, 2017; 15 pages; State Intellectual Property Office of the People's Republic of China, Beijing, People's Republic of China.
Machine-generated English Translations of WO2007010743, obtained via Espacenet Patent Search.
Machine-generated English Translation of JPH02-0221763, obtained via JPlat-Pat.
Japanese Office Action of Patent Application No. 2016-507003, dated Jan. 30, 2018.
English Translation of Japanese Office Action of Patent Application No. 2016-507003, dated Jan. 30, 2018.

* cited by examiner

DIRECT DRIVE HYDROSTATIC TRANSMISSION

RELATED APPLICATIONS

The present application claims the benefit of U.S. Provisional Application No. 61/811,581 filed on Apr. 12, 2013, which is incorporated herein in its entirety by reference.

FIELD OF THE INVENTION

The present invention relates to hydrostatic drivelines and more specifically to a hydrostatic drivelines having a direct drive capability.

BACKGROUND OF THE INVENTION

Hydrostatic transmissions use a hydraulic fluid to transmit power from a power source (for example, an internal combustion engine) to a power output (for example, a final drive or a plurality of wheels). Hydrostatic transmissions are typically used in agricultural tractors and other off-highway equipment, for example, forklifts, excavators, earth moving machines, and other vehicles.

The major benefits of hydrostatic transmissions are a large range of continuously variable speed, a precise control of traction effort and speed, and high maneuverability. Each of these benefits is directly related to vehicle productivity. Other advantages include high power capability in a compact size, a fast response related to low inertia, maintaining a controlled speed regardless of load, high traction force at a low engine speed, flexibility in packaging, dynamic braking, and simplicity in reversing vehicle direction. Compared to traditional solutions, such as a hydrodynamic transmission with a torque converter, hydrostatic transmissions can provide improved performance. As a non-limiting example, a wheel loader application may require high maneuverability and a wide torque and speed conversion range.

Hydrostatic transmissions are not without their drawbacks, however. Hydrostatic transmissions tend to have a lower overall efficiency, increased maintenance costs, and increased initial investment cost compared to conventional gear transmissions. As a result, design considerations for a given application in a hydrostatic transmission are very important. As a non-limiting example, a hydrostatic transmission design can focus on one or more particular operating modes, such as low speed driving to provide maximum tractive effort, variable speed operation, or maximum speed operation. Focusing a design on an operating mode, will increase an overall efficiency of the transmission and proper sizing of transmission components will result in a more cost-effective solution.

A hydrostatic driveline can be divided into many standard categories based on the characteristics of the hydraulic pump and the hydraulic motor. The hydrostatic driveline can include a fixed displacement pump or a variable displacement pump and a fixed displacement motor or a variable displacement motor. A common combination amongst hydrostatic drivelines is a driveline configured with a variable displacement pump and a fixed displacement motor. In this combination, an output speed is controlled by varying a displacement of the pump.

To increase versatility of a hydrostatic driveline, such as including a high output capacity and a wide velocity of operational ranges, many alternative concepts of hydrostatic drivelines have been developed to meet such demands. One of the simplest and most common solutions is to use the hydrostatic transmission with a mechanical gearbox connected in series. However, such a driveline is typically inefficient as the driveline does not provide a direct drive mode of operation.

The direct drive mode of operation enables the use of one or more additional power paths between the power source and the power output. The additional power paths provides a wider range of output speeds compared to a hydrostatic power path alone, through the use of a bypass path that connects the power source "directly" through one or more gear ratio paths to the power output, without incurring losses which are inherent in the hydrostatic power path. "Direct drive" power paths are already well-known in the art. One such implementation of the direct drive mode of operation is performed by locking up a torque converter. Publications which are exemplary of the direct drive mode of operation are U.S. Pat. No. 5,946,983, assigned to Clark Hurth Components S.P.A., and U.S. Patent Application No. 2011/0030505 assigned to J.C. Bamford Excavators Limited and JCB Transmissions.

While the concept the direct drive mode of operation is widely understood, the present invention provides a unique approach to optimize drive ratios used with the power paths and arrangements of components that is effective in both cost and performance. It would be advantageous to develop a hydrostatic driveline that includes a direct drive capability, which offers the benefits of increased efficiency at a high speed operating mode while maintaining the benefits of a hydrostatic drive at a low speed operating mode.

SUMMARY OF THE INVENTION

Presently provided by the invention, a hydrostatic driveline that includes a direct drive capability, which offers the benefits of increased efficiency at a high speed operating mode while maintaining the benefits of a hydrostatic drive at a low speed operating mode, has surprisingly been discovered.

In one embodiment, the present invention is directed to a hydrostatic driveline. The hydrostatic driveline comprises a power source, a hydrostatic pump, a hydrostatic motor, a direct drive link, a first transmission portion, and a second transmission portion. The hydrostatic pump is in driving engagement with the power source. The hydrostatic motor is in fluid communication with the hydrostatic pump. The direct drive link is in driving engagement with at least one of the power source and the hydrostatic pump. The first transmission portion is in driving engagement with a vehicle output and the hydrostatic motor. The second transmission portion is in driving engagement with the direct drive link and at least one of the vehicle output and the first transmission portion. The hydrostatic pump, the hydrostatic motor, and the first transmission portion form a first power path for the hydrostatic driveline and the direct drive link and the second transmission portion form a second power path for the hydrostatic driveline.

Various aspects of this invention will become apparent to those skilled in the art from the following detailed description of the preferred embodiment, when read in light of the accompanying drawings.

BRIEF DESCRIPTION OF THE FIGURES

The above, as well as other advantages of the present invention will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
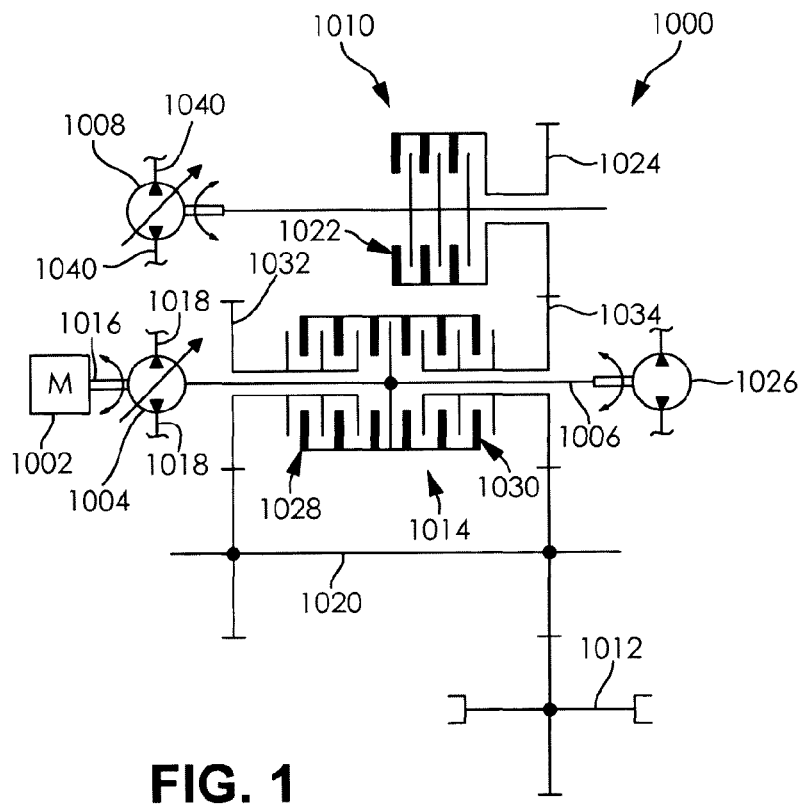
FIG. 1 is a schematic illustration of a hydrostatic driveline according to an embodiment of the present invention.

FIG. 1 illustrates a hydrostatic driveline 1000. The hydrostatic driveline 1000 includes a power source 1002 in driving engagement with a first hydrostatic pump 1004 and a direct drive link 1006. The first hydrostatic pump 1004 is in fluid communication with a hydrostatic motor 1008. The hydrostatic motor 1008 is in driving engagement with a first transmission portion 1010, which is in driving engagement with a vehicle output 1012. The direct drive link 1006 is in driving engagement with a second transmission portion 1014, which is in driving engagement with the vehicle output 1012. The hydrostatic driveline 1000 may be operated in a hydrostatic mode or a direct drive mode.

The power source 1002 applies power to an input 1016 of the hydrostatic driveline 1000. The power source 1002 is, for example, an internal combustion engine; however, it is understood that the power source 1002 may include an electric motor or another source of rotational output. It is understood that the power source 1002 may be a hybrid power source including both an internal combustion engine and an electric motor. Further, it is understood that the power source 1002 may include an output ratio adjusting device as known in the art. Further, it is understood that the power source 1002 may include an engagement device (not shown) as known in the art, for one of reducing and interrupting a rotational force transferred to the hydrostatic driveline 1000.

The input 1016 is in driving engagement with the power source 1002, the first hydrostatic pump 1004, and the direct drive link 1006. The input 1016 may be a gear, a plurality of gears, a shaft, or another type of mechanical connection.

The first hydrostatic pump 1004 is a hydraulic axial piston pump having a movable swashplate (not shown) which varies a displacement thereof. However, it is understood the first hydrostatic pump 1004 may be any other type of variable displacement pump. As mentioned hereinabove, the first hydrostatic pump 1004 is drivingly engaged with the power source 1002 through the input 1016. The first hydrostatic pump 1004 is in fluid communication with the hydrostatic motor 1008 through at least two fluid conduits 1018. As the first hydrostatic pump 1004 is drivingly engaged with the power source 1002, a drive portion of the first hydrostatic pump 1004 always rotates in the same direction as the power source 1002. A direction of flow through the first hydrostatic pump 1004 is changed by adjusting a swashplate angle of the first hydrostatic pump 1004. By adjusting the swashplate angle of the first hydrostatic pump 1004, a forward and a reverse direction is provided when the hydrostatic driveline 1000 is operated in the hydrostatic mode.

The hydrostatic motor 1008 is a variable displacement hydraulic motor having a movable swashplate (not shown) which varies a displacement, and thus a rotational speed, thereof. However, it is understood the hydrostatic motor 1008 may be another type of hydraulic motor. The hydrostatic motor 1008 is drivingly engaged with the first transmission portion 1010. The hydrostatic motor 1008 is in fluid communication with the first hydrostatic pump 1004 through the at least two fluid conduits 1018.

The first transmission portion 1010 is a clutching arrangement drivingly engaged with the hydrostatic motor 1008. The first transmission portion 1010 is also drivingly engaged with the vehicle output 1012 through a portion of the second transmission portion 1014 and a lay shaft 1020. The first transmission portion 1010 includes a first engagement device 1022 and a first drive ratio 1024. By engaging the first engagement device 1022, the hydrostatic motor 1008 is drivingly engaged with the vehicle output 1012 through the first drive ratio 1024, the second transmission portion 1014, and the lay shaft 1020. The first engagement device 1022 is a clutch which may be variably engaged; however, it is understood that other types of engagement devices may be used. As mentioned hereinabove, by adjusting the swashplate angle of the first hydrostatic pump 1004, the first transmission portion 1010, and thus the vehicle output 1012, may be operated in a forward and a reverse direction.

The direct drive link 1006 is a mechanical connection which facilitates driving engagement between the input

1016 and the second transmission portion 1014. The direct drive link 1006 is also in driving engagement with a second hydrostatic pump 1026.

The second transmission portion 1014 is a clutching arrangement drivingly engaged with the direct drive link 1006 and the vehicle output 1012 through the lay shaft 1020. The second transmission portion 1014 includes a second engagement device 1028, a third engagement device 1030, a second drive ratio 1032, and a third drive ratio 1034. By engaging one of the engagement devices 1028, 1030, one of the drive ratios 1032, 1034 is selected. The engagement devices 1028, 1030 are clutches which may be variably engaged; however, it is understood that other types of engagement devices may be used. The drive ratios 1032, 1034 of the second transmission portion 1014 are configured as two forward drive speeds; however, it is understood that the second transmission portion 2014 may have other drive speed arrangements.

The lay shaft 1020 is a mechanical connection in driving engagement with the second drive ratio 1032, the third drive ratio 1034, and the vehicle output 1012. The lay shaft 1020 is a rotatably mounted shaft, but it is understood that the lay shaft 1020 may be a gear, a plurality of gears, or another type of mechanical connection. A first portion 1036 of the lay shaft is in driving engagement with the second drive ratio 1032 through a plurality of gear teeth. A second portion 1038 of the lay shaft is in driving engagement with the third drive ratio 1034 and the vehicle output 1012 through a plurality of gear teeth.

The second hydrostatic pump 1026 is a fixed displacement hydraulic pump. However, it is understood the second hydrostatic pump 1026 may be any other type of hydraulic pump. As mentioned hereinabove, the second hydrostatic pump 1026 is drivingly engaged with the power source 1002 through the input 1016 and the direct drive link 1006. The second hydrostatic pump 1026 may be in fluid communication with the hydrostatic motor 1008 through at least two fluid conduits 1040 or the second hydrostatic motor 1026 may be in fluid communication with an auxiliary circuit (not shown).

In use, the hydrostatic driveline 1000 may be operated in the hydrostatic mode or the direct drive mode. In either of the drive modes, only one of the engagement devices 1022, 1028, 1030 may be fully engaged at any given instant. In the hydrostatic mode, the hydrostatic driveline 1000 is operated at lower speeds using the first drive ratio 1024. As mentioned hereinabove, by adjusting the swashplate angle of the hydrostatic pump 1004, the forward and the reverse direction is provided to the first drive ratio 1024. In the direct drive mode, the hydrostatic driveline 1000 is operated at higher speeds using one of the second drive ratio 1032 and the third drive ratio 1034. As mentioned hereinabove, the drive ratios 1032, 1034 of the second transmission portion 1014 are configured as two forward drive speeds. Further, it is understood that a reverse drive option may be added to the direct drive mode of the hydrostatic driveline 1000 through the addition of further components, such as an additional gear, to the hydrostatic driveline 1000.

Figure 2:
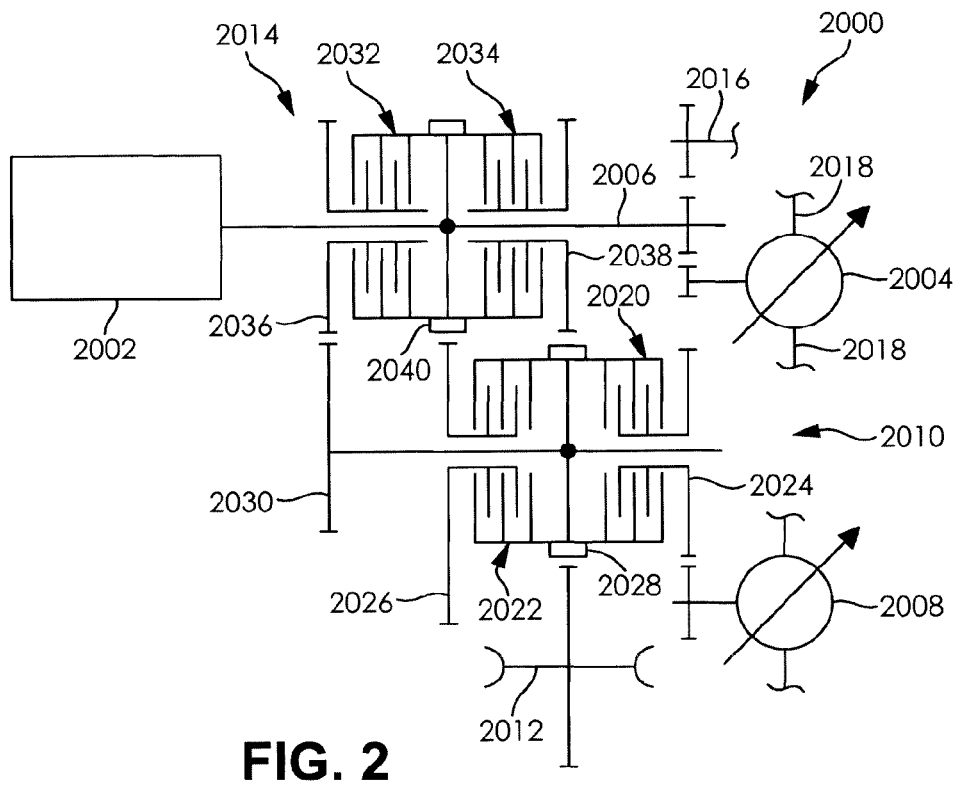
FIG. 2 is a schematic illustration of a hydrostatic driveline according to another embodiment of the present invention.

FIG. 2 illustrates a hydrostatic driveline 2000 according to another embodiment of the invention. The hydrostatic driveline 2000 includes a power source 2002 in driving engagement with a first hydrostatic pump 2004 through a direct drive link 2006. The first hydrostatic pump 2004 is in fluid communication with a hydrostatic motor 2008. The hydrostatic motor 2008 is in driving engagement with a first transmission portion 2010, which is in driving engagement with a vehicle output 2012. The direct drive link 2006 is in driving engagement with a second transmission portion 2014, which is in driving engagement with the vehicle output 2012 through the first transmission portion 2010. The hydrostatic driveline 2000 may be operated in a hydrostatic mode or a direct drive mode.

The power source 2002 applies power to the direct drive link 2006 of the hydrostatic driveline 2000. The power source 2002 is, for example, an internal combustion engine; however, it is understood that the power source 2002 may include an electric motor or another source of rotational output. It is understood that the power source 2002 may be a hybrid power source including both an internal combustion engine and an electric motor. Further, it is understood that the power source 2002 may include an output ratio adjusting device as known in the art. Further, it is understood that the power source 2002 may include an engagement device (not shown) as known in the art, for one of reducing and interrupting a rotational force transferred to the hydrostatic driveline 2000.

The direct drive link 2006 is a mechanical connection which facilitates driving engagement between the power source 2002 and the first hydrostatic pump 2004. The direct drive link 2006 is also in driving engagement with the second transmission portion 2014 and a power take off 2016. The direct drive link 2006 is a rigid shaft; however, the direct drive link 2006 may also be a gear, a plurality of gears, or another type of mechanical connection.

The first hydrostatic pump 2004 is a hydraulic axial piston pump having a movable swashplate (not shown) which varies a displacement thereof. However, it is understood the first hydrostatic pump 2004 may be any other type of variable displacement pump. As mentioned hereinabove, the first hydrostatic pump 2004 is drivingly engaged with the power source 2002 through the direct drive link 2006. The first hydrostatic pump 2004 is in fluid communication with the hydrostatic motor 2008 through at least two fluid conduits 2018. As the first hydrostatic pump 2004 is drivingly engaged with the power source 2002, a drive portion of the first hydrostatic pump 2004 always rotates in the same direction as the power source 2002. A direction of flow through the first hydrostatic pump 2004 is changed by adjusting a swashplate angle of the first hydrostatic pump 2004. By adjusting the swashplate angle of the first hydrostatic pump 2004, a forward and a reverse direction is provided when the hydrostatic driveline 2000 is operated in the hydrostatic mode.

The hydrostatic motor 2008 is a variable displacement hydraulic motor having a movable swashplate (not shown) which varies a displacement, and thus a rotational speed, thereof. However, it is understood the hydrostatic motor 2008 may be another type of hydraulic motor. The hydrostatic motor 2008 is drivingly engaged with the first transmission portion 2010. The hydrostatic motor 2008 is in fluid communication with the first hydrostatic pump 2004 through the at least two fluid conduits 2018.

The first transmission portion 2010 is a clutching arrangement drivingly engaged with the hydrostatic motor 2008 and the second transmission portion 2014. The first transmission portion 2010 is also drivingly engaged with the vehicle output 2012 through a portion of the second transmission portion 2014. The first transmission portion 2010 includes a first engagement device 2020, a second engagement device 2022, a first drive ratio 2024, a second drive ratio 2026, a third drive ratio 2028, and a fourth drive ratio 2030. By engaging the first engagement device 2020, the hydrostatic motor 2008 is drivingly engaged with the vehicle output 2012 through the first drive ratio 2024 and the third drive ratio 2028. The first engagement device 2020 is a clutch which may be variably engaged; however, it is understood that other types of engagement devices may be used. As mentioned hereinabove, by adjusting the swashplate angle of the first hydrostatic pump 2004, the first transmission portion 2010, and thus the vehicle output 2012, may be operated in a forward and a reverse direction. By engaging the second engagement device 2022, the second transmission portion 2014 is drivingly engaged with the vehicle output 2012 through the second drive ratio 2026 and the third drive ratio 2028. The second engagement device 2022 is a clutch which may be variably engaged; however, it is understood that other types of engagement devices may be used. The third drive ratio 2028 is in driving engagement with a portion of the second transmission portion 2014. The fourth drive ratio 2030 is also in driving engagement with a portion of the second transmission portion 2014.

The second transmission portion 2014 is a clutching arrangement drivingly engaged with the direct drive link 2006 and the vehicle output 2012 through the first transmission portion 2010. The second transmission portion 2014 includes a third engagement device 2032, a fourth engagement device 2034, a fifth drive ratio 2036, a sixth drive ratio 2038, and a seventh drive ratio 2040. By engaging one of the engagement devices 2032, 2034 one of the drive ratios 2036, 2038 is selected. The engagement devices 2032, 2034 are clutches which may be variably engaged; however, it is understood that other types of engagement devices may be used. The drive ratios 2036, 2038 of the second transmission portion 2014 are configured as two forward drive speeds; however, it is understood that the second transmission portion 2014 may have other drive speed arrangements. The fifth drive ratio 2036 is in driving engagement with the fourth drive ratio 2030 of the first transmission portion 2010. The sixth drive ratio 2038 is in driving engagement with the third drive ratio 2028 of the first transmission portion 2010. The seventh drive ratio 2040 is in driving engagement with the direct drive link 2006 and the second drive ratio 2026 of the first transmission portion 2010.

The power take off 2016 is a mechanical connection in driving engagement with the direct drive link 2006. The power takeoff 2016 may be in driving engagement with an auxiliary device (not shown).

In use, the hydrostatic driveline 2000 may be operated in the hydrostatic mode or the direct drive mode. In either of the drive modes, only one of the engagement devices 2020, 2022, 2032, 2034 may be fully engaged at any given instant. In the hydrostatic mode, the hydrostatic driveline 2000 is operated at lower speeds by driving the vehicle output 2012 through the first drive ratio 2024, the first engagement device 2020, and the third drive ratio 2028. As mentioned hereinabove, by adjusting the swashplate angle of the hydrostatic pump 2004, the forward and the reverse direction is provided to the first drive ratio 2024. In the direct drive mode, the hydrostatic driveline 2000 is operated at higher speeds using one of the third drive ratio 2028 driven through the sixth drive ratio 2028 using the fourth engagement device 2034, the second drive ratio 2026 driven through the seventh drive ratio 2040 using the second engagement device 2022, or the fourth drive ratio 2030 driven through the fifth drive ratio 2036 using the third engagement device 2032. As mentioned hereinabove, the drive ratios 2026, 2036, 2038 of the transmission portions 2010, 2014 are configured as three forward drive speeds. Further, it is understood that a reverse drive option may be added to the direct drive mode of the hydrostatic driveline 2000 through the addition of further components, such as an additional gear, to the hydrostatic driveline 2000.

Figure 3:
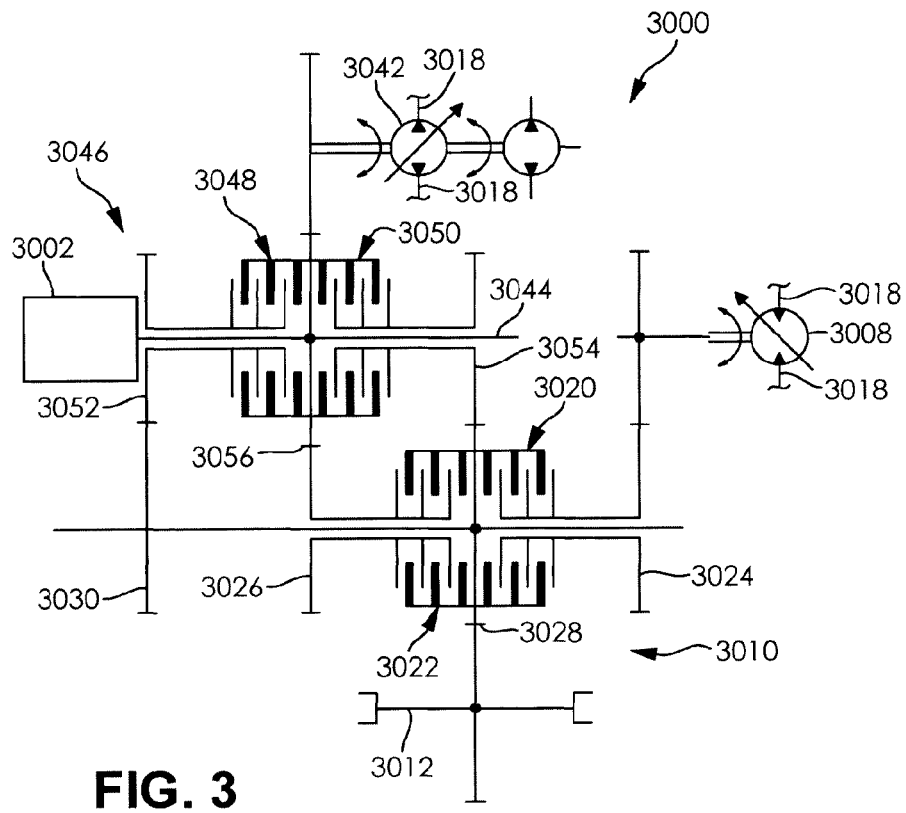
FIG. 3 is a schematic illustration of a hydrostatic driveline according to another embodiment of the present invention.

FIG. 3 illustrates a hydrostatic driveline 3000 according to another embodiment of the invention. The hydrostatic driveline 3000 is a variation of the hydrostatic driveline 2000, and has similar features thereto. The variation of the invention shown in FIG. 3 includes similar components to the hydrostatic driveline 2000 illustrated in FIG. 2. Similar features of the variation shown in FIG. 3 are numbered similarly in series. Different and additional features of the variation shown in FIG. 3 can be appreciated by one skilled in the art in view of FIG. 3 and the hydrostatic driveline 2000 illustrated in FIG. 2. Further, it is understood that a reverse drive option may be added to a direct drive mode of the hydrostatic driveline 3000 through the addition of further components to the hydrostatic driveline 3000.

The hydrostatic driveline 3000 includes a power source 3002 in driving engagement with a first hydrostatic pump 3042 through a direct drive link 3044. The first hydrostatic pump 3042 is in fluid communication with a hydrostatic motor 3008. The hydrostatic motor 3008 is in driving engagement with a first transmission portion 3010, which is in driving engagement with a vehicle output 3012. The direct drive link 3044 is in driving engagement with a second transmission portion 3046, which is in driving engagement with the vehicle output 3012 through the first transmission portion 3010. The hydrostatic driveline 3000 may be operated in a hydrostatic mode or a direct drive mode.

The direct drive link 3044 is a mechanical connection which facilitates driving engagement between the power source 3002 and the first hydrostatic pump 3042 through the second transmission portion 3046. The direct drive link 3044 is a rigid shaft; however, the direct drive link 3044 may also be a gear, a plurality of gears, or another type of mechanical connection.

The second transmission portion 3046 is a clutching arrangement drivingly engaged with the direct drive link 3044 and the vehicle output 3012 through the first transmission portion 3010. The second transmission portion 3046 includes a third engagement device 3048, a fourth engagement device 3050, a fifth drive ratio 3052, a sixth drive ratio 3054, and a seventh drive ratio 3056. By engaging one of the engagement devices 3048, 3050 one of the drive ratios 3052, 3042 is selected. The engagement devices 3048, 3050 are clutches which may be variably engaged; however, it is understood that other types of engagement devices may be used. The drive ratios 3052, 3042 of the second transmission portion 3046 are configured as two forward drive speeds; however, it is understood that the second transmission portion 3046 may have other drive speed arrangements. The fifth drive ratio 3052 is in driving engagement with the fourth drive ratio 3030 of the first transmission portion 32010. The sixth drive ratio 3054 is in driving engagement with the third drive ratio 3028 of the first transmission portion 3010. The seventh drive ratio 3056 is in driving engagement with the direct drive link 3044 and the second drive ratio 3026 of the first transmission portion 3010.

The first hydrostatic pump 3042 is a hydraulic axial piston pump having a movable swashplate (not shown) which varies a displacement thereof. However, it is understood the first hydrostatic pump 3042 may be any other type of variable displacement pump. The first hydrostatic pump 3042 is drivingly engaged with the power source 3002 through the direct drive link 2006 and the seventh drive ratio 3056. The first hydrostatic pump 3042 is in fluid communication with the hydrostatic motor 3008 through at least two fluid conduits 3018. As the first hydrostatic pump 3042 is drivingly engaged with the power source 3002, a drive portion of the first hydrostatic pump 3042 always rotates in the same direction as the power source 3002. A direction of flow through the first hydrostatic pump 3042 is changed by adjusting a swashplate angle of the first hydrostatic pump 3042. By adjusting the swashplate angle of the first hydrostatic pump 3042, a forward and a reverse direction is provided when the hydrostatic driveline 3000 is operated in the hydrostatic mode.

The hydrostatic driveline 3000 further comprises an auxiliary pump 3058. The auxiliary pump 3058 is in driving engagement with the first hydrostatic pump 3042. The auxiliary pump 3058 is a fixed displacement hydraulic pump. However, it is understood the auxiliary pump 3058 may be another type of hydraulic pump. The auxiliary pump 3058 may be in fluid communication with the hydrostatic motor 3008 or an auxiliary device (not shown).

In use, the hydrostatic driveline 3000 may be operated in the hydrostatic mode or the direct drive mode. In either of the drive modes, only one of the engagement devices 3020, 3022, 3048, 3050 may be fully engaged at any given instant. In the hydrostatic mode, the hydrostatic driveline 3000 is operated at lower speeds by driving the vehicle output 3012 through the first drive ratio 3024, the first engagement device 3020, and the third drive ratio 3028. As mentioned hereinabove, by adjusting the swashplate angle of the first hydrostatic pump 3042, the forward and the reverse direction is provided to the first drive ratio 3024. In the direct drive mode, the hydrostatic driveline 3000 is operated at higher speeds using one of the third drive ratio 3028 driven through the sixth drive ratio 3054 using the fourth engagement device 3050, the second drive ratio 3026 driven through the seventh drive ratio 3056 using the second engagement device 3022, or the fourth drive ratio 3030 driven through the fifth drive ratio 3052 using the third engagement device 3048. As mentioned hereinabove, the drive ratios 3026, 3052, 3056 of the transmission portions 3010, 3046 are configured as three forward drive speeds. Further, it is understood that a reverse drive option may be added to the direct drive mode of the hydrostatic driveline 3000 through the addition of further components, such as an additional gear, to the hydrostatic driveline 3000.

Figure 4:
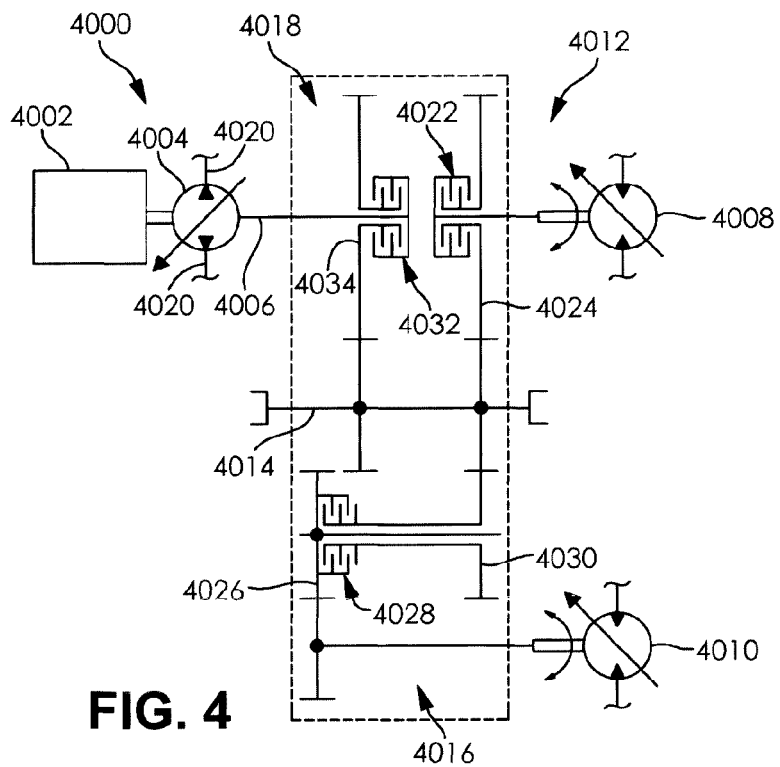
FIG. 4 is a schematic illustration of a hydrostatic driveline according to another embodiment of the present invention.

FIG. 4 illustrates a hydrostatic driveline 4000 according to another embodiment of the invention. The hydrostatic driveline 1000 includes a power source 4002 in driving engagement with a first hydrostatic pump 4004 and a direct drive link 4006. The first hydrostatic pump 4004 is in fluid communication with a first hydrostatic motor 4008 and a second hydrostatic motor 4010. The first hydrostatic motor 4008 is in driving engagement with a first transmission portion 4012, which is in driving engagement with a vehicle output 4014. The second hydrostatic motor 4010 is in driving engagement with a second transmission portion 4016, which is in driving engagement with the vehicle output 4014. The direct drive link 4006 is in driving engagement with a third transmission portion 4018, which is in driving engagement with the vehicle output 4014. The hydrostatic driveline 4000 may be operated in a hydrostatic mode or a direct drive mode.

The power source 4002 applies power to the direct drive link 4006 of the hydrostatic driveline 4000 through the first hydrostatic pump 4004. The power source 4002 is, for example, an internal combustion engine; however, it is understood that the power source 4002 may include an electric motor or another source of rotational output. It is understood that the power source 4002 may be a hybrid power source including both an internal combustion engine and an electric motor. Further, it is understood that the power source 4002 may include an output ratio adjusting device as known in the art. Further, it is understood that the power source 4002 may include an engagement device (not shown) as known in the art, for one of reducing and interrupting a rotational force transferred to the hydrostatic driveline 4000.

The direct drive link 4006 is in driving engagement with the power source 4002 and the third transmission portion 4018 through the first hydrostatic pump 4004. The direct drive link 4006 may be a gear, a plurality of gears, a shaft, or another type of mechanical connection.

The first hydrostatic pump 4004 is a hydraulic axial piston pump having a movable swashplate (not shown) which varies a displacement thereof. However, it is understood the first hydrostatic pump 4004 may be any other type of variable displacement pump. As mentioned hereinabove, the first hydrostatic pump 4004 is drivingly engaged with the power source 4002 and the direct drive link 4006. The first hydrostatic pump 4004 is in fluid communication with the first hydrostatic motor 4008 and the second hydrostatic motor 4010 through at least two fluid conduits 4020. As the first hydrostatic pump 4004 is drivingly engaged with the power source 4002, a drive portion of the first hydrostatic pump 4004 always rotates in the same direction as the power source 4002. A direction of flow through the first hydrostatic pump 4004 is changed by adjusting a swashplate angle of the first hydrostatic pump 4004. By adjusting the swashplate angle of the first hydrostatic pump 4004, a forward and a reverse direction is provided when the hydrostatic driveline 4000 is operated in the hydrostatic mode.

The first hydrostatic motor 4008 is a variable displacement hydraulic motor having a movable swashplate (not shown) which varies a displacement, and thus a rotational speed, thereof. However, it is understood the first hydrostatic motor 4008 may be another type of hydraulic motor. The first hydrostatic motor 4008 is drivingly engaged with the first transmission portion 4012. The first hydrostatic motor 4008 is in fluid communication with the first hydrostatic pump 4004 through the at least two fluid conduits 4020.

The first transmission portion 4012 is a clutching arrangement drivingly engaged with the first hydrostatic motor 4008. The first transmission portion 4012 is also drivingly engaged with the vehicle output 4014. The first transmission portion 4012 includes a first engagement device 4022 and a first drive ratio 4024. By engaging the first engagement device 4022, the first hydrostatic motor 4008 is drivingly engaged with the vehicle output 4014 through the first drive ratio 4024. The first engagement device 4022 is a clutch which may be variably engaged; however, it is understood that other types of engagement devices may be used. As mentioned hereinabove, by adjusting the swashplate angle of the first hydrostatic pump 4004, the first transmission portion 4012, and thus the vehicle output 4014, may be operated in a forward and a reverse direction.

The second hydrostatic motor 4010 is a variable displacement hydraulic motor having a movable swashplate (not shown) which varies a displacement, and thus a rotational speed, thereof. However, it is understood the second hydrostatic motor 4010 may be another type of hydraulic motor. The second hydrostatic motor 4010 is drivingly engaged with the second transmission portion 4016. The second hydrostatic motor 4010 is in fluid communication with the first hydrostatic pump 4004 through the at least two fluid conduits 4020.

The second transmission portion 4016 is a clutching arrangement drivingly engaged with the second hydrostatic motor 4010. The second transmission portion 4016 is also drivingly engaged with the vehicle output 4014. The second transmission portion 4012 includes a second drive ratio 4026, a second engagement device 4028, and a third drive ratio 4030. By engaging the second engagement device 4028, the second hydrostatic motor 4010 is drivingly engaged with the vehicle output 4014 through the second drive ratio 4026 and the third drive ratio 4030. The second engagement device 4028 is a clutch which may be variably engaged; however, it is understood that other types of engagement devices may be used. As mentioned hereinabove, by adjusting the swashplate angle of the first hydrostatic pump 4004, the second transmission portion 4016, and thus the vehicle output 4014, may be operated in a forward and a reverse direction.

The third transmission portion 4018 is a clutching arrangement drivingly engaged with the first hydrostatic pump 4004 through the direct drive link 4006. The third transmission portion 4018 is also drivingly engaged with the vehicle output 4014. The third transmission portion 4018 includes a third engagement device 4032 and a fourth drive ratio 4034. By engaging the third engagement device 4032, the direct drive link 4006, and thus the power source 4002, is drivingly engaged with the vehicle output 4014 through the fourth drive ratio 4034. The third engagement device 4032 is a clutch which may be variably engaged; however, it is understood that other types of engagement devices may be used.

In use, the hydrostatic driveline 4000 may be operated in the hydrostatic mode or the direct drive mode. In either of the drive modes, only one of the engagement devices 4022, 4028, 4032 may be fully engaged at any given instant. The hydrostatic driveline 4000 may be operated in two hydrostatic modes and one direct drive mode. In either of the hydrostatic modes, the hydrostatic driveline 4000 is operated at lower speeds using the first drive ratio 4024 or the second drive ratio 4026 and the third drive ratio 4030. As mentioned hereinabove, by adjusting the swashplate angle of the hydrostatic pump 4004, the forward and the reverse direction may be provided to at least one of the first drive ratio 4024 or the second drive ratio 4026 and the third drive ratio 4030. In the direct drive mode, the hydrostatic driveline 4000 is operated at higher speeds using the fourth drive ratio 4034. The drive ratio 4034 of the third transmission portion 4018 is configured as a forward drive speed. Further, it is understood that a reverse drive option may be added to the direct drive mode of the hydrostatic driveline 4000 through the addition of further components, such as an additional gear, to the hydrostatic driveline 4000.

Figure 5:
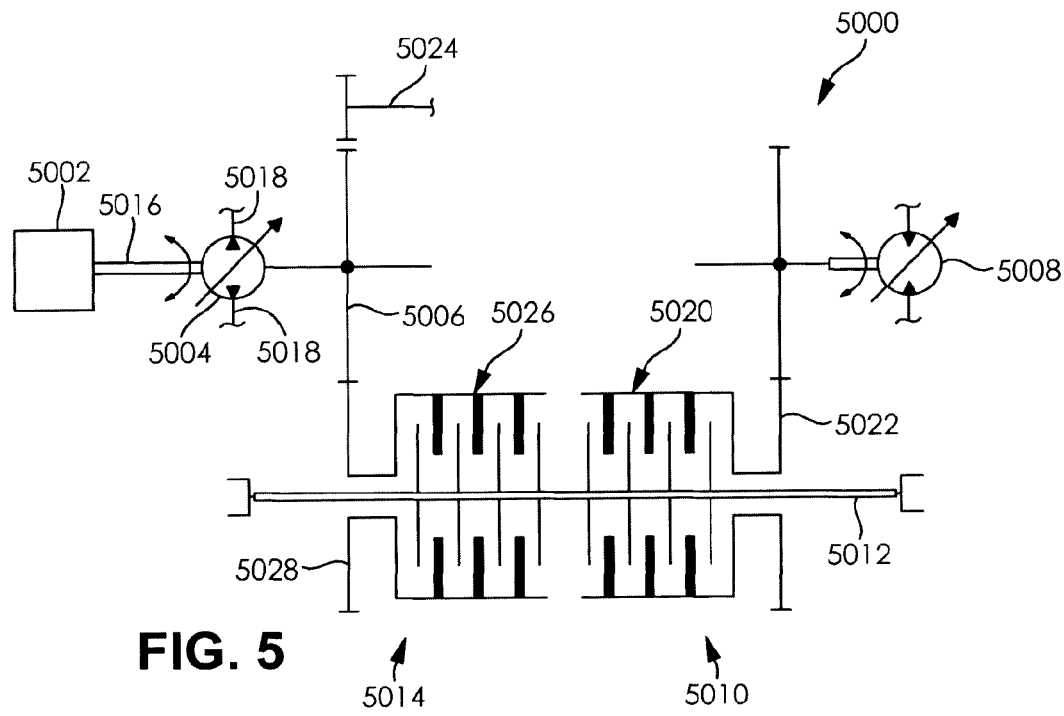
FIG. 5 is a schematic illustration of a hydrostatic driveline according to another embodiment of the present invention.

FIG. 5 illustrates a hydrostatic driveline 5000 according to another embodiment of the invention. The hydrostatic driveline 5000 includes a power source 5002 in driving engagement with a hydrostatic pump 5004 and a direct drive link 5006. The hydrostatic pump 5004 is in fluid communication with a hydrostatic motor 5008. The hydrostatic motor 5008 is in driving engagement with a first transmission portion 5010, which is in driving engagement with a vehicle output 5012. The direct drive link 5006 is in driving engagement with a second transmission portion 5014, which is in driving engagement with the vehicle output 5012. The hydrostatic driveline 5000 may be operated in a hydrostatic mode or a direct drive mode.

The power source 5002 applies power to an input 5016 of the hydrostatic driveline 5000. The power source 5002 is, for example, an internal combustion engine; however, it is understood that the power source 5002 may include an electric motor or another source of rotational output. It is understood that the power source 5002 may be a hybrid power source including both an internal combustion engine and an electric motor. Further, it is understood that the power source 5002 may include an output ratio adjusting device as known in the art. Further, it is understood that the power source 5002 may include an engagement device (not shown) as known in the art, for one of reducing and interrupting a rotational force transferred to the hydrostatic driveline 5000.

The input 5016 is in driving engagement with the power source 5002 and the hydrostatic pump 5004. The input 5016 may be a gear, a plurality of gears, a shaft, or another type of mechanical connection.

The hydrostatic pump 5004 is a hydraulic axial piston pump having a movable swashplate (not shown) which varies a displacement thereof. However, it is understood the hydrostatic pump 5004 may be any other type of variable displacement pump. As mentioned hereinabove, the hydrostatic pump 5004 is drivingly engaged with the power source 5002 through the input 5016. The hydrostatic pump 5004 is in fluid communication with the hydrostatic motor 5008 through at least two fluid conduits 5018. As the hydrostatic pump 5004 is drivingly engaged with the power source 5002, a drive portion of the hydrostatic pump 5004 always rotates in the same direction as the power source 5002. A direction of flow through the hydrostatic pump 5004 is changed by adjusting a swashplate angle of the hydrostatic pump 5004. By adjusting the swashplate angle of the hydrostatic pump 5004, a forward and a reverse direction is provided when the hydrostatic driveline 5000 is operated in the hydrostatic mode.

The hydrostatic motor 5008 is a variable displacement hydraulic motor having a movable swashplate (not shown) which varies a displacement, and thus a rotational speed, thereof. However, it is understood the hydrostatic motor 5008 may be another type of hydraulic motor. The hydrostatic motor 5008 is drivingly engaged with the first transmission portion 5010. The hydrostatic motor 5008 is in fluid communication with the hydrostatic pump 5004 through the at least two fluid conduits 5018.

The first transmission portion 5010 is a clutching arrangement drivingly engaged with the hydrostatic motor 5008. The first transmission portion 5010 is also drivingly engaged with the vehicle output 5012. The first transmission portion 5010 includes a first engagement device 5020 and a first drive ratio 5022. By engaging the first engagement device 5020, the hydrostatic motor 5008 is drivingly engaged with the vehicle output 5012 through the first drive ratio 5022. The first engagement device 5020 is a clutch which may be variably engaged; however, it is understood that other types of engagement devices may be used. As mentioned hereinabove, by adjusting the swashplate angle of the hydrostatic pump 5004, the first transmission portion 5010, and thus the vehicle output 5012, may be operated in a forward and a reverse direction.

The direct drive link 5006 is a mechanical connection which facilitates driving engagement between the hydrostatic pump 5004 and the second transmission portion 5014. As shown in FIG. 5, the direct drive link 5006 is a gear which adjusts a drive ratio between the hydrostatic pump 5004 and the second transmission portion 5014. The direct drive link 5006 is also in driving engagement with a power take off 5024.

The second transmission portion 5014 is a clutching arrangement drivingly engaged with the direct drive link 5006 and the vehicle output 5012. The second transmission portion 5014 includes a second engagement device 5026 and a second drive ratio 5028. By engaging the second engagement device 5026, the hydrostatic pump 5004 is drivingly engaged with the vehicle output 5012 through the second drive ratio 5028. The second engagement device 5026 is a clutch which may be variably engaged; however, it is understood that other types of engagement devices may be used. The second drive ratio 5028 of the second transmission portion 5014 is configured as a forward drive speed; however, it is understood that the second transmission portion 5014 may have another drive speed arrangement. The power take off 5024 is a mechanical connection in driving engagement with the direct drive link 5006. The power takeoff 5024 may be in driving engagement with an auxiliary device (not shown).

In use, the hydrostatic driveline 5000 may be operated in the hydrostatic mode or the direct drive mode. In either of the drive modes, only one of the engagement devices 5020, 5026 may be fully engaged at any given instant. In the hydrostatic mode, the hydrostatic driveline 5000 is operated at lower speeds using the first drive ratio 5022. As mentioned hereinabove, by adjusting the swashplate angle of the hydrostatic pump 5004, the forward and the reverse direction is provided to the first drive ratio 5024, and thus the vehicle output 5012. In the direct drive mode, the hydrostatic driveline 5000 is operated at higher speeds using the second drive ratio 5028, through the second engagement device 5026. As mentioned hereinabove, the second drive ratio 5028 of the second transmission portion 5014 is configured as a forward drive speed. Further, it is understood that a reverse drive option may be added to the direct drive mode of the hydrostatic driveline 5000 through the addition of further components, such as an additional gear, to the hydrostatic driveline 5000.

Figure 6:
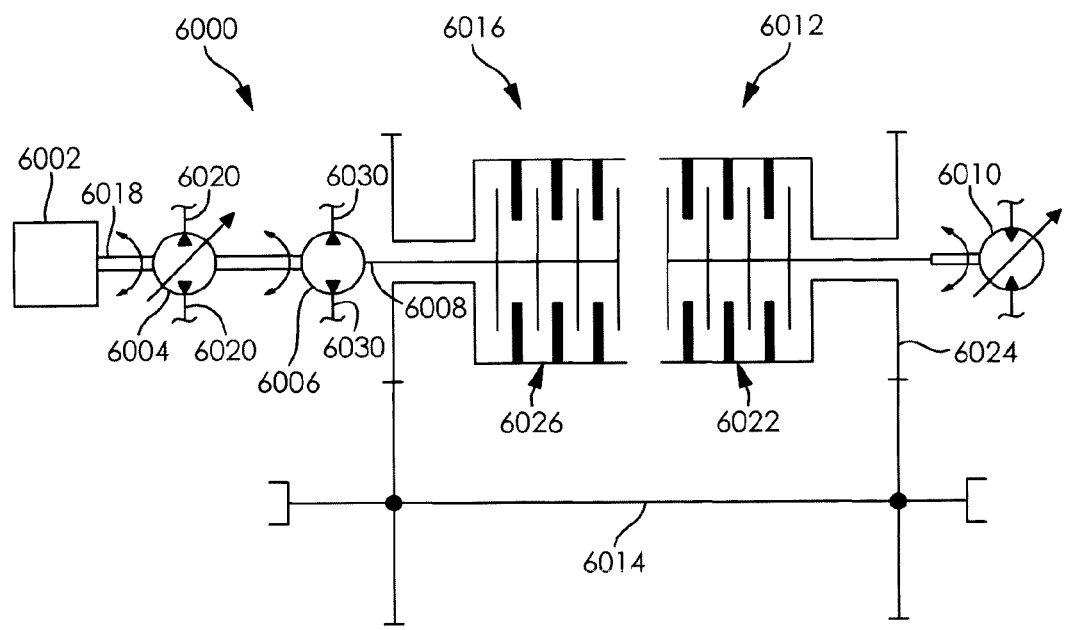
FIG. 6 is a schematic illustration of a hydrostatic driveline according to another embodiment of the present invention.

FIG. 6 illustrates a hydrostatic driveline 6000 according to another embodiment of the invention. The hydrostatic driveline 6000 includes a power source 6002 in driving engagement with a hydrostatic pump 6004, an auxiliary pump 6006, and a direct drive link 6008. The hydrostatic pump 6004 is in fluid communication with a hydrostatic motor 6010. The hydrostatic motor 6010 is in driving engagement with a first transmission portion 6012, which is in driving engagement with a vehicle output 6014. The direct drive link 6008 is in driving engagement with a second transmission portion 6016, which is in driving engagement with the vehicle output 6014. The hydrostatic driveline 6000 may be operated in a hydrostatic mode or a direct drive mode.

The power source 6002 applies power to an input 6018 of the hydrostatic driveline 6000. The power source 6002 is, for example, an internal combustion engine; however, it is understood that the power source 6002 may include an electric motor or another source of rotational output. It is understood that the power source 6002 may be a hybrid power source including both an internal combustion engine and an electric motor. Further, it is understood that the power source 6002 may include an output ratio adjusting device as known in the art. Further, it is understood that the power source 6002 may include an engagement device (not shown) as known in the art, for one of reducing and interrupting a rotational force transferred to the hydrostatic driveline 6000.

The input 6018 is in driving engagement with the power source 6002 and the hydrostatic pump 6004. The input 6018 may be a gear, a plurality of gears, a shaft, or another type of mechanical connection.

The hydrostatic pump 6004 is a hydraulic axial piston pump having a movable swashplate (not shown) which varies a displacement thereof. However, it is understood the hydrostatic pump 6004 may be any other type of variable displacement pump. As mentioned hereinabove, the hydrostatic pump 6004 is drivingly engaged with the power source 6002 through the input 6018. The hydrostatic pump 6004 is in fluid communication with the hydrostatic motor 6010 through at least two fluid conduits 6020. As the hydrostatic pump 6004 is drivingly engaged with the power source 6002, a drive portion of the hydrostatic pump 6004 always rotates in the same direction as the power source 6002. A direction of flow through the hydrostatic pump 6004 is changed by adjusting a swashplate angle of the hydrostatic pump 6004. By adjusting the swashplate angle of the hydrostatic pump 6004, a forward and a reverse direction is provided when the hydrostatic driveline 6000 is operated in the hydrostatic mode.

The hydrostatic motor 6010 is a variable displacement hydraulic motor having a movable swashplate (not shown) which varies a displacement, and thus a rotational speed, thereof. However, it is understood the hydrostatic motor 6010 may be another type of hydraulic motor. The hydrostatic motor 6010 is drivingly engaged with the first transmission portion 6012. The hydrostatic motor 6010 is in fluid communication with the hydrostatic pump 6004 through the at least two fluid conduits 6018.

The first transmission portion 6012 is a clutching arrangement drivingly engaged with the hydrostatic motor 6010. The first transmission portion 6012 is also drivingly engaged with the vehicle output 6014. The first transmission portion 6012 includes a first engagement device 6022 and a first drive ratio 6024. By engaging the first engagement device 6022, the hydrostatic motor 6010 is drivingly engaged with the vehicle output 6014 through the first drive ratio 6024. The first engagement device 6022 is a clutch which may be variably engaged; however, it is understood that other types of engagement devices may be used. As mentioned hereinabove, by adjusting the swashplate angle of the hydrostatic pump 6004, the first transmission portion 6012, and thus the vehicle output 6014, may be operated in a forward and a reverse direction.

The direct drive link 6008 is a mechanical connection which facilitates driving engagement between the auxiliary pump 6006 and the second transmission portion 6016. As shown in FIG. 6, the direct drive link 6008 is a shaft joining the auxiliary pump 6006 and the second transmission portion 6016.

The second transmission portion 6016 is a clutching arrangement drivingly engaged with the direct drive link 6008 and the vehicle output 6014. The second transmission portion 6016 includes a second engagement device 6026 and a second drive ratio 6028. By engaging the second engagement device 6026, the hydrostatic pump 6004 is drivingly engaged with the vehicle output 6014 through the second drive ratio 6028. The second engagement device 6026 is a clutch which may be variably engaged; however, it is understood that other types of engagement devices may be used. The second drive ratio 6028 of the second transmission portion 6016 is configured as a forward drive speed; however, it is understood that the second transmission portion 6016 may have another drive speed arrangement.

The auxiliary pump 6006 is a fixed displacement hydraulic pump. However, it is understood the auxiliary pump 6006 may be any other type of hydraulic pump. As mentioned hereinabove, the auxiliary pump 6006 is drivingly engaged with the power source 1002 through the hydrostatic pump 6004 and the direct drive link 6008. The auxiliary pump 6006 may be in fluid communication with the hydrostatic motor 6010 through at least two fluid conduits 6030 or the auxiliary pump 6006 may be in fluid communication with an auxiliary circuit (not shown).

In use, the hydrostatic driveline 6000 may be operated in the hydrostatic mode or the direct drive mode. In either of the drive modes, only one of the engagement devices 6022, 6026 may be fully engaged at any given instant. In the hydrostatic mode, the hydrostatic driveline 6000 is operated at lower speeds using the first drive ratio 6022. As mentioned hereinabove, by adjusting the swashplate angle of the hydrostatic pump 6004, the forward and the reverse direction is provided to the first drive ratio 6024, and thus the vehicle output 6014. In the direct drive mode, the hydrostatic driveline 6000 is operated at higher speeds using the second drive ratio 6028, through the second engagement device 6026. As mentioned hereinabove, the second drive ratio 6028 of the second transmission portion 6016 is configured as a forward drive speed. Further, it is understood that a reverse drive option may be added to the direct drive mode of the hydrostatic driveline 6000 through the addition of further components, such as an additional gear, to the hydrostatic driveline 6000.

Figure 7:
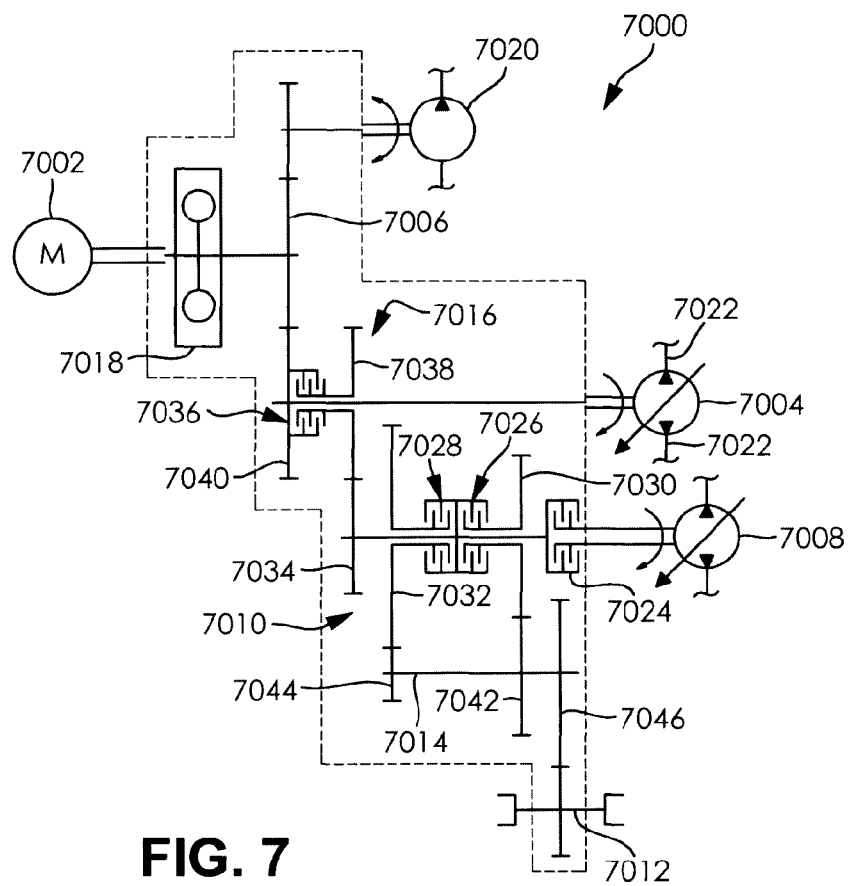
FIG. 7 is a schematic illustration of a hydrostatic driveline according to another embodiment of the present invention.

FIG. 7 illustrates a hydrostatic driveline 7000 according to another embodiment of the invention. The hydrostatic driveline 7000 includes a power source 7002 in driving engagement with a first hydrostatic pump 7004 through a direct drive link 7006. The first hydrostatic pump 7004 is in fluid communication with a hydrostatic motor 7008. The hydrostatic motor 7008 is in driving engagement with a first transmission portion 7010, which is in driving engagement with a vehicle output 7012 through a lay shaft 7014. The direct drive link 7006 is in driving engagement with a second transmission portion 7016, which is in driving engagement with the vehicle output 7012 through the first transmission portion 7010 and the lay shaft 7014. The hydrostatic driveline 7000 may be operated in a hydrostatic mode or a direct drive mode.

The power source 7002 applies power to the direct drive link 7006 of the hydrostatic driveline 7000. The power source 7002 is, for example, an internal combustion engine; however, it is understood that the power source 7002 may include an electric motor or another source of rotational output. It is understood that the power source 7002 may be a hybrid power source including both an internal combustion engine and an electric motor. As shown in FIG. 7, the power source 7002 includes a torque converter 7018, which is an optional component of the hydrostatic driveline 7000. Further, it is understood that the power source 7002 may include an output ratio adjusting device as known in the art. Further, it is understood that the power source 7002 may include an engagement device (not shown) as known in the art, for one of reducing and interrupting a rotational force transferred to the hydrostatic driveline 7000.

The direct drive link 7006 is a mechanical connection which facilitates driving engagement between the power source 7002 and the first hydrostatic pump 7004 through the second transmission portion 7016. The direct drive link 7006 is also in driving engagement with an auxiliary pump 7020. The direct drive link 7006 is a gear; however, the direct drive link 7006 may also be a shaft, a plurality of gears, or another type of mechanical connection.

The first hydrostatic pump 7004 is a hydraulic axial piston pump having a movable swashplate (not shown) which varies a displacement thereof. However, it is understood the first hydrostatic pump 7004 may be any other type of variable displacement pump. The first hydrostatic pump 7004 is drivingly engaged with the power source 7002 through the direct drive link 7006 and the second transmission portion 7016. The first hydrostatic pump 7004 is in fluid communication with the hydrostatic motor 7008 through at least two fluid conduits 7022. As the first hydrostatic pump 7004 is drivingly engaged with the power source 7002, a drive portion of the first hydrostatic pump 7004 always rotates in the same direction as the power source 7002. A direction of flow through the first hydrostatic pump 7004 is changed by adjusting a swashplate angle of the first hydrostatic pump 7004. By adjusting the swashplate angle of the first hydrostatic pump 7004, a forward and a reverse direction is provided when the hydrostatic driveline 7000 is operated in the hydrostatic mode.

The hydrostatic motor 7008 is a variable displacement hydraulic motor having a movable swashplate (not shown) which varies a displacement, and thus a rotational speed, thereof. However, it is understood the hydrostatic motor 7008 may be another type of hydraulic motor. The hydrostatic motor 7008 is drivingly engaged with the first transmission portion 7010. The hydrostatic motor 7008 is in fluid communication with the first hydrostatic pump 7004 through the at least two fluid conduits 7022.

The first transmission portion 7010 is a clutching arrangement drivingly engaged with the lay shaft 7014 and the second transmission portion 7016. The first transmission portion 7010 is drivingly engaged with the vehicle output 7012 through the lay shaft 7014. The first transmission portion 7010 includes a first engagement device 7024, a second engagement device 7026, a third engagement device 7028, a first drive ratio 7030, a second drive ratio 7032, and a third drive ratio 7034. By engaging the first engagement device 7024, the hydrostatic motor 7008 is drivingly engaged with the first transmission portion 7010. The first engagement device 7024 is a clutch which may be variably engaged; however, it is understood that other types of engagement devices may be used. By engaging the second engagement device 7026, the third drive ratio 7034 is drivingly engaged with the first drive ratio 7030, facilitating driving engagement between one of the second transmission portion 7016 and the hydrostatic motor 7008 and the vehicle output 7012 through the first drive ratio 7030. The second engagement device 7026 is a clutch which may be variably engaged; however, it is understood that other types of engagement devices may be used. By engaging the third engagement device 7028, the third drive ratio 7034 is drivingly engaged with the second drive ratio 7032, facilitating driving engagement between one of the second transmission portion 7016 and the hydrostatic motor 7008 and the vehicle output 7012 through the second drive ratio 7032. The third engagement device 7028 is a clutch which may be variably engaged; however, it is understood that other types of engagement devices may be used.

The second transmission portion 7016 is a clutching arrangement drivingly engaged with the direct drive link 7006 and the vehicle output 7012 through the first transmission portion 7010 and the lay shaft 7014. The second transmission portion 7016 includes a fourth engagement device 7036, a fourth drive ratio 7038, and a fifth drive ratio 7040. By engaging the fourth engagement device 7036, the direct drive link 7006 is placed in driving engagement with the third drive ratio 7034 through the fourth drive ratio 7038 and the fifth drive ratio 7040. The fourth engagement device 7036 is a clutch which may be variably engaged; however, it is understood that other types of engagement devices may be used.

The lay shaft 7014 is a mechanical connection in driving engagement with the first drive ratio 7030, the second drive ratio 7032, and the vehicle output 7012. The lay shaft 7014 is a rotatably mounted shaft, but it is understood that the lay shaft 7014 may be a gear, a plurality of gears, or another type of mechanical connection. A first portion 7042 of the lay shaft is in driving engagement with the first drive ratio 7030 through a plurality of gear teeth. A second portion 7044 of the lay shaft is in driving engagement with the second drive ratio 7032 through a plurality of gear teeth. A third portion 7046 of the lay shaft is in driving engagement with the vehicle output 7012 through a plurality of gear teeth.

The auxiliary pump 7020 is in driving engagement with the direct drive link 7006. The auxiliary pump 7020 is a fixed displacement hydraulic pump. However, it is understood the auxiliary pump 7020 may be another type of hydraulic pump. The auxiliary pump 7020 may be in fluid communication with the hydrostatic motor 7008 or an auxiliary device (not shown).

In use, the hydrostatic driveline 7000 may be operated in the hydrostatic mode or the direct drive mode. In either of the drive modes, only one of the engagement devices 7026, 7028 may be fully engaged at any given instant. In the hydrostatic mode, the first engagement device 7024 is engaged and the hydrostatic driveline 7000 is operated at lower speeds by driving the vehicle output 7012 through either the second engagement device 7026 and the first drive ratio 7030 or the third engagement device 7028 and the second drive ratio 7032. As mentioned hereinabove, by adjusting the swashplate angle of the hydrostatic pump 7004, the forward and the reverse direction is provided to the vehicle output 7012, through the lay shaft 7014 and one of the engagement devices 7026, 7028. In the direct drive mode, the fourth engagement device 7036 is engaged and the hydrostatic driveline 7000 is operated at higher speeds by driving the vehicle output 7012 through either the second engagement device 7026 and the first drive ratio 7030 or the third engagement device 7028 and the second drive ratio 7032. The drive ratios 7030, 7032 of the second transmission portion 7016 are configured as two different drive speeds, and may be used in either the hydrostatic mode or the direct drive mode. Further, it is understood that a reverse drive option may be added to the direct drive mode of the hydrostatic driveline 7000 through the addition of further components, such as an additional gear, to the hydrostatic driveline 7000.

Figure 8:
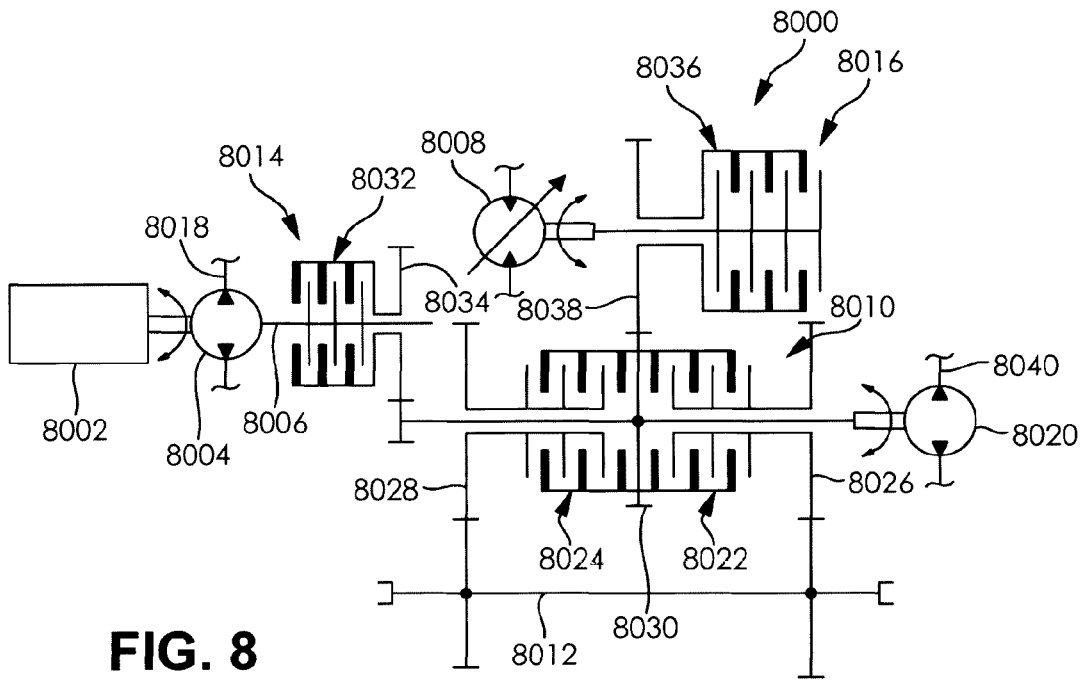
FIG. 8 is a schematic illustration of a hydrostatic driveline according to another embodiment of the present invention.

FIG. 8 illustrates a hydrostatic driveline 8000 according to another embodiment of the invention. The hydrostatic driveline 8000 includes a power source 8002 in driving engagement with a first hydrostatic pump 8004 and a direct drive link 8006. The first hydrostatic pump 8004 is in fluid communication with a hydrostatic motor 8008. The hydrostatic motor 8008 is in driving engagement with a third transmission portion 8016, which is in driving engagement with a first transmission portion 8010, which is in driving engagement with a vehicle output 8012. The direct drive link 8006 is in driving engagement with a second transmission portion 8014, which is in driving engagement with the first transmission portion 8010. The hydrostatic driveline 8000 may be operated in a hydrostatic mode or a direct drive mode.

The power source 8002 applies power to the first hydrostatic pump 8004 of the hydrostatic driveline 8000. The power source 8002 is, for example, an internal combustion engine; however, it is understood that the power source 8002 may include an electric motor or another source of rotational output. It is understood that the power source 8002 may be a hybrid power source including both an internal combustion engine and an electric motor. Further, it is understood that the power source 8002 may include an output ratio adjusting device as known in the art. Further, it is understood that the power source 8002 may include an engagement device (not shown) as known in the art, for one of reducing and interrupting a rotational force transferred to the hydrostatic driveline 8000.

The first hydrostatic pump 8004 is a hydraulic axial piston pump having a movable swashplate (not shown) which varies a displacement thereof. However, it is understood the first hydrostatic pump 8004 may be any other type of variable displacement pump. As mentioned hereinabove, the first hydrostatic pump 8004 is drivingly engaged with the power source 8002. The first hydrostatic pump 8004 is in fluid communication with the hydrostatic motor 8008 through at least two fluid conduits 8018. As the first hydrostatic pump 8004 is drivingly engaged with the power source 8002, a drive portion of the first hydrostatic pump 8004 always rotates in the same direction as the power source 8002. A direction of flow through the first hydrostatic pump 8004 is changed by adjusting a swashplate angle of the first hydrostatic pump 8004. By adjusting the swashplate angle of the first hydrostatic pump 8004, a forward and a reverse direction is provided when the hydrostatic driveline 8000 is operated in the hydrostatic mode.

The hydrostatic motor 8008 is a variable displacement hydraulic motor having a movable swashplate (not shown) which varies a displacement, and thus a rotational speed, thereof. However, it is understood the hydrostatic motor 8008 may be another type of hydraulic motor. The hydrostatic motor 8008 is drivingly engaged with the third transmission portion 8016. The hydrostatic motor 8008 is in fluid communication with the first hydrostatic pump 8004 through the at least two fluid conduits 8018.

The first transmission portion 8010 is a clutching arrangement drivingly engaged with the hydrostatic motor 8008, the second transmission portion 8014, the vehicle output 8012, and an auxiliary pump 8020. The first transmission portion 8010 includes a first engagement device 8022, a second engagement device 8024, a first drive ratio 8026, a second drive ratio 8028, and a third drive ratio 8030. By engaging the first engagement device 8022, the first transmission portion 8010 is drivingly engaged with the vehicle output 8012 through the first drive ratio 8026. The first engagement device 8022 is a clutch which may be variably engaged; however, it is understood that other types of engagement devices may be used. By engaging the second engagement device 8024, the first transmission portion 8010 is drivingly engaged with the vehicle output 8012 through the second drive ratio 8028. The second engagement device 8024 is a clutch which may be variably engaged; however, it is understood that other types of engagement devices may be used. The third drive ratio 8030 is in driving engagement with a portion of the third transmission portion 8016.

The direct drive link 8006 is a mechanical connection which facilitates driving engagement between the first hydrostatic pump 8004 and the second transmission portion 8014. The direct drive link 8006 is a shaft, but it is understood that the direct drive link 8006 may be a gear, a plurality of gears, or another type of mechanical connection.

The second transmission portion 8014 is a clutching arrangement drivingly engaged with the direct drive link 8006 and the vehicle output 8012 through the first transmission portion 8010. The second transmission portion 8014 includes a third engagement device 8032 and a fourth drive ratio 8034. By engaging the third engagement device 8032, the first transmission portion 8010 is drivingly engaged with the direct drive link 8006 through the fourth drive ratio

8034. The third engagement device 8032 is a clutch which may be variably engaged; however, it is understood that other types of engagement devices may be used. The fourth drive ratio 8034 of the second transmission portion 8014 is configured as a forward drive speed; however, it is understood that the second transmission portion 8014 may have other drive speed arrangements.

The third transmission portion 8016 is a clutching arrangement drivingly engaged with the hydrostatic motor 8008 and the vehicle output 8012 through the first transmission portion 8010. The third transmission portion 8016 includes a fourth engagement device 8036 and a fifth drive ratio 8038. By engaging the fourth engagement device 8036, the first transmission portion 8010 is drivingly engaged with the hydrostatic motor 8008 through the fifth drive ratio 8038 and the third drive ratio 8030. The fourth engagement device 8036 is a clutch which may be variably engaged; however, it is understood that other types of engagement devices may be used. The fifth drive ratio 8038 of the third transmission portion 8016 is configured as either a forward drive speed or a reverse drive speed, depending on a rotation of the hydrostatic motor 8008; however, it is understood that the third transmission portion 8016 may have other drive speed arrangements.

The auxiliary pump 8020 is a fixed displacement hydraulic pump. However, it is understood the auxiliary pump 8020 may be any other type of hydraulic pump. The auxiliary pump 8020 is drivingly engaged with the power source 8002 through the direct drive link 1006 and the second transmission portion 8014. The auxiliary pump 8020 may be in fluid communication with the hydrostatic motor 8008 through at least two fluid conduits 8040 or the auxiliary pump 8020 may be in fluid communication with an auxiliary circuit (not shown).

In use, the hydrostatic driveline 8000 may be operated in the hydrostatic mode or the direct drive mode. In either of the drive modes, one of the engagement devices 8022, 8024 and one of the remaining engagement devices 8032, 3036 are engaged at any given instant. In the hydrostatic mode, the hydrostatic driveline 8000 is operated at lower speeds using the fifth drive ratio 8038 and one of the first drive ratio 8026 and the second drive ratio 8028. As mentioned hereinabove, by adjusting the swashplate angle of the hydrostatic pump 8004, the forward and the reverse direction is provided to the fifth drive ratio 8038 through the hydrostatic motor 8008. In the direct drive mode, the hydrostatic driveline 8000 is operated at higher speeds using the fourth drive ratio 8034 and one of the first drive ratio 8026 and the second drive ratio 8028. The drive ratios 8026, 8028 of the first transmission portion 8010 are configured as either forward or reverse drive speeds.

Figure 9:
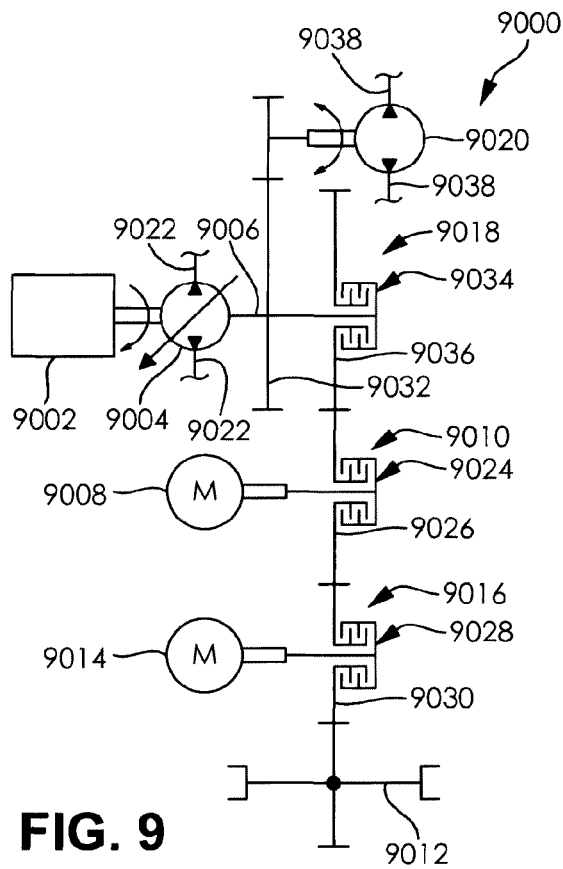
FIG. 9 is a schematic illustration of a hydrostatic driveline according to another embodiment of the present invention.

FIG. 9 illustrates a hydrostatic driveline 9000 according to another embodiment of the invention. The hydrostatic driveline 9000 includes a power source 9002 in driving engagement with a first hydrostatic pump 9004 and a direct drive link 9006. The first hydrostatic pump 9004 is in fluid communication with a first hydrostatic motor 9008. The first hydrostatic motor 9008 is in driving engagement with a first transmission portion 9010, which is in driving engagement with a vehicle output 9012. The first hydrostatic pump 9004 is in fluid communication with a second hydrostatic motor 9014. The second hydrostatic motor 9014 is in driving engagement with a second transmission portion 9016, which is in driving engagement with the vehicle output 9012. The direct drive link 9006 is in driving engagement with a third transmission portion 9018, which is in driving engagement with the first transmission portion 9010. An auxiliary pump 9020 is in driving engagement with the direct drive link 9006. The hydrostatic driveline 9000 may be operated in a hydrostatic mode or a direct drive mode.

The power source 9002 applies power to the first hydrostatic pump 9004 of the hydrostatic driveline 9000. The power source 9002 is, for example, an internal combustion engine; however, it is understood that the power source 9002 may include an electric motor or another source of rotational output. It is understood that the power source 9002 may be a hybrid power source including both an internal combustion engine and an electric motor. Further, it is understood that the power source 9002 may include an output ratio adjusting device as known in the art. Further, it is understood that the power source 9002 may include an engagement device (not shown) as known in the art, for one of reducing and interrupting a rotational force transferred to the hydrostatic driveline 9000.

The first hydrostatic pump 9004 is a hydraulic axial piston pump having a movable swashplate (not shown) which varies a displacement thereof. However, it is understood the first hydrostatic pump 9004 may be any other type of variable displacement pump. As mentioned hereinabove, the first hydrostatic pump 9004 is drivingly engaged with the power source 9002. The first hydrostatic pump 9004 is in fluid communication with the first hydrostatic motor 9008 and the second hydrostatic motor 9014 through at least two fluid conduits 9022. As the first hydrostatic pump 9004 is drivingly engaged with the power source 9002, a drive portion of the first hydrostatic pump 9004 always rotates in the same direction as the power source 9002. A direction of flow through the first hydrostatic pump 9004 is changed by adjusting a swashplate angle of the first hydrostatic pump 9004. By adjusting the swashplate angle of the first hydrostatic pump 9004, a forward and a reverse direction is provided when the hydrostatic driveline 9000 is operated in the hydrostatic mode.

The first hydrostatic motor 9008 is a variable displacement hydraulic motor having a movable swashplate (not shown) which varies a displacement, and thus a rotational speed, thereof. However, it is understood the first hydrostatic motor 9008 may be another type of hydraulic motor. The first hydrostatic motor 9008 is drivingly engaged with the first transmission portion 9010. The first hydrostatic motor 9008 is in fluid communication with the first hydrostatic pump 9004 through the at least two fluid conduits 9022.

The first transmission portion 9010 is a clutching arrangement drivingly engaged with the first hydrostatic motor 9008, the second transmission portion 9016, and the third transmission portion 9018. The first transmission portion 9010 includes a first engagement device 9024 and a first drive ratio 9026. By engaging the first engagement device 9024, the first hydrostatic motor 9008 is drivingly engaged with the vehicle output 9012 through the first drive ratio 9026 and a portion of the second transmission portion 9016. The first engagement device 9024 is a clutch which may be variably engaged; however, it is understood that other types of engagement devices may be used.

The second hydrostatic motor 9014 is a variable displacement hydraulic motor having a movable swashplate (not shown) which varies a displacement, and thus a rotational speed, thereof. However, it is understood the second hydrostatic motor 9014 may be another type of hydraulic motor. The second hydrostatic motor 9014 is drivingly engaged with the second transmission portion 9016. The second hydrostatic motor 9014 is in fluid communication with the first hydrostatic pump 9004 through the at least two fluid conduits 9022.

The second transmission portion 9016 is a clutching arrangement drivingly engaged with the second hydrostatic motor 9014, the first transmission portion 9010, and the vehicle output 9012. The second transmission portion 9016 includes a second engagement device 9028 and a second drive ratio 9030. By engaging the second engagement device 9028, the second hydrostatic motor 9014 is drivingly engaged with the vehicle output 9012 through the second drive ratio 9026. The second engagement device 9028 is a clutch which may be variably engaged; however, it is understood that other types of engagement devices may be used.

The direct drive link 9006 is a mechanical connection which facilitates driving engagement between the first hydrostatic pump 9004 and the third transmission portion 9018. The direct drive link 9006 includes a geared portion 9032 which is in driving engagement with the auxiliary pump 9020. The direct drive link 9006 is a shaft, but it is understood that the direct drive link 9006 may be a gear, a plurality of gears, or another type of mechanical connection.

The third transmission portion 9018 is a clutching arrangement drivingly engaged with the first hydrostatic pump 9004 and the vehicle output 9012 through the first drive ratio 9026 and the second drive ratio 9030. The third transmission portion 9016 includes a third engagement device 9034 and a third drive ratio 9036. By engaging the third engagement device 9034, the third drive ratio 9036 is drivingly engaged with the first hydrostatic pump 9004. Further, the direct drive link 9006 becomes drivingly engaged with the vehicle output 9012 through the third drive ratio 9036, the first drive ratio 9026, and the second drive ratio 9030. The third engagement device 9034 is a clutch which may be variably engaged; however, it is understood that other types of engagement devices may be used. The third drive ratio 9036 of the third transmission portion 9018 is configured as a forward drive speed; however, it is understood that the third transmission portion 9018 may have other drive speed arrangements.

The auxiliary pump 9020 is a fixed displacement hydraulic pump. However, it is understood the auxiliary pump 9020 may be any other type of hydraulic pump. The auxiliary pump 9020 is drivingly engaged with the power source 9002 through the geared portion 9032 of the direct drive link 9006. The auxiliary pump 9020 may be in fluid communication with the first hydrostatic motor 9008 and the second hydrostatic motor 9014 through at least two fluid conduits 9038 or the auxiliary pump 9020 may be in fluid communication with an auxiliary circuit (not shown).

In use, the hydrostatic driveline 9000 may be operated in the hydrostatic mode or the direct drive mode. In either of the drive modes, one of the engagement devices 9024, 9028, 9034 is engaged at any given instant. In the hydrostatic mode, the hydrostatic driveline 9000 is operated at lower speeds using one of the first drive ratio 9026 through the first engagement device 9024 and the second drive ratio 9030 through the second engagement device 9028. As mentioned hereinabove, by adjusting the swashplate angle of the hydrostatic pump 9004, the forward and the reverse direction is provided to the vehicle output 9012 through the first hydrostatic motor 9008 or the second hydrostatic motor 9014. The drive ratios 9026, 9030 are configured as either forward or reverse drive speeds. In the direct drive mode, the hydrostatic driveline 9000 is operated at higher speeds using the third drive ratio 9036 through the first drive ratio 9026 and the second drive ratio 9030.

Figure 10:
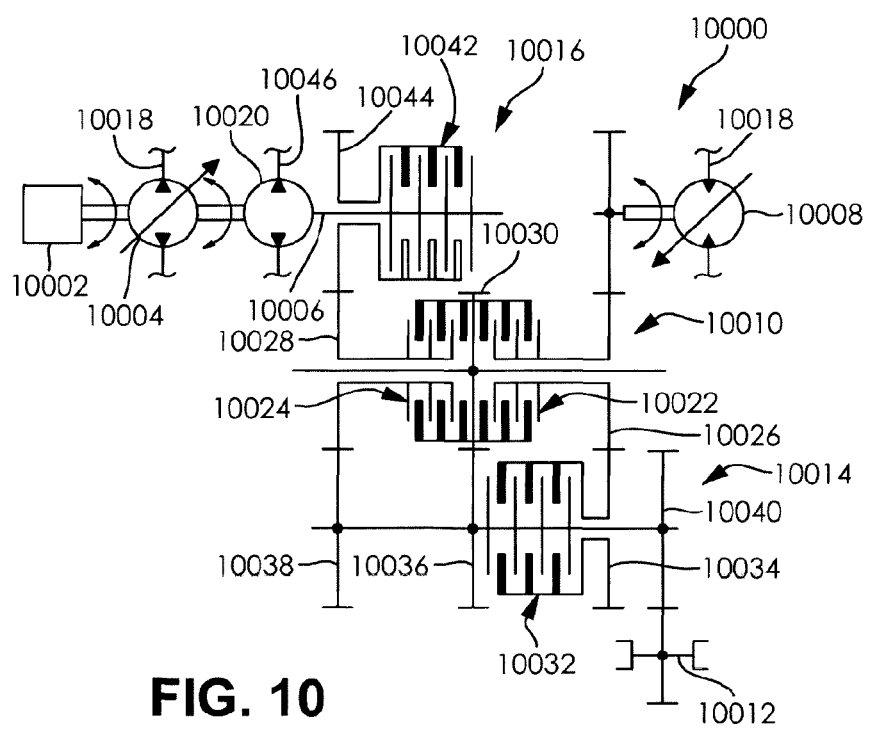
FIG. 10 is a schematic illustration of a hydrostatic driveline according to another embodiment of the present invention.

FIG. 10 illustrates a hydrostatic driveline 10000 according to another embodiment of the invention. The hydrostatic driveline 10000 includes a power source 10002 in driving engagement with a first hydrostatic pump 10004 and a direct drive link 10006. The first hydrostatic pump 10004 is in fluid communication with a hydrostatic motor 10008. The hydrostatic motor 10008 is in driving engagement with a first transmission portion 10010, which is in driving engagement with a vehicle output 10012 through a second transmission portion 10014. The direct drive link 10006 is in driving engagement with the second transmission portion 10014 through a third transmission portion 10016 and the first transmission portion 10010. The hydrostatic driveline 10000 may be operated in a hydrostatic mode or a direct drive mode.

The power source 10002 applies power to the first hydrostatic pump 10004 of the hydrostatic driveline 10000. The power source 10002 is, for example, an internal combustion engine; however, it is understood that the power source 10002 may include an electric motor or another source of rotational output. It is understood that the power source 10002 may be a hybrid power source including both an internal combustion engine and an electric motor. Further, it is understood that the power source 10002 may include an output ratio adjusting device as known in the art. Further, it is understood that the power source 10002 may include an engagement device (not shown) as known in the art, for one of reducing and interrupting a rotational force transferred to the hydrostatic driveline 10000.

The first hydrostatic pump 10004 is a hydraulic axial piston pump having a movable swashplate (not shown) which varies a displacement thereof. However, it is understood the first hydrostatic pump 10004 may be any other type of variable displacement pump. As mentioned hereinabove, the first hydrostatic pump 10004 is drivingly engaged with the power source 10002. The first hydrostatic pump 10004 is in fluid communication with the hydrostatic motor 10008 through at least two fluid conduits 10018. As the first hydrostatic pump 10004 is drivingly engaged with the power source 10002, a drive portion of the first hydrostatic pump 10004 always rotates in the same direction as the power source 10002. A direction of flow through the first hydrostatic pump 10004 is changed by adjusting a swashplate angle of the first hydrostatic pump 10004. By adjusting the swashplate angle of the first hydrostatic pump 10004, a forward and a reverse direction is provided when the hydrostatic driveline 10000 is operated in the hydrostatic mode. The first hydrostatic pump 10004 is in driving engagement with an auxiliary pump 10020.

The hydrostatic motor 10008 is a variable displacement hydraulic motor having a movable swashplate (not shown) which varies a displacement, and thus a rotational speed, thereof. However, it is understood the hydrostatic motor 10008 may be another type of hydraulic motor. The hydrostatic motor 10008 is drivingly engaged with the first transmission portion 10010 and the second transmission portion 10014 through a portion of the first transmission portion 10010. The hydrostatic motor 10008 is in fluid communication with the first hydrostatic pump 10004 through the at least two fluid conduits 10018.

The first transmission portion 10010 is a clutching arrangement drivingly engaged with the hydrostatic motor 10008, the second transmission portion 10014, and the third transmission portion 10016. The first transmission portion 10010 includes a first engagement device 10022, a second engagement device 10024, a first drive ratio 10026, a second drive ratio 10028, and a third drive ratio 10030. By engaging the first engagement device 10022, the first transmission portion 10010 is drivingly engaged with a portion of the second transmission portion 10014 through the third drive ratio 10030. The first engagement device 10022 is a clutch which may be variably engaged; however, it is understood that other types of engagement devices may be used. By engaging the second engagement device 10024, the first transmission portion 10010 is drivingly engaged with a portion of the second transmission portion 10014 and the third transmission portion 10016 through the second drive ratio 10028. The second engagement device 10024 is a clutch which may be variably engaged; however, it is understood that other types of engagement devices may be used. The third drive ratio 10030 is in driving engagement with a portion of the second transmission portion 10014.

The second transmission portion 10014 is a clutching arrangement drivingly engaged with the first transmission portion 10010 and the vehicle output 10012. The second transmission portion 10014 includes a third engagement device 10032, a fourth drive ratio 10034, a fifth drive ratio 10036, a sixth drive ratio 10038, and a geared portion 10040. By engaging the third engagement device 10032, the second transmission portion 10014 is drivingly engaged with the hydrostatic motor 10008 through the first drive ratio 10026 and the fourth drive ratio 10034. The third engagement device 10032 is a clutch which may be variably engaged; however, it is understood that other types of engagement devices may be used. The fifth drive ratio 10036 is drivingly engaged with the third drive ratio 10030 of the first transmission portion 10010. The sixth drive ratio 10038 is drivingly engaged with the second drive ratio 10028 of the first transmission portion 10010. The geared portion 10040 of the second transmission portion 10014 is in driving engagement with the vehicle output 10012.

The direct drive link 10006 is a mechanical connection which facilitates driving engagement between the first hydrostatic pump 10004 and the third transmission portion 10016 through the auxiliary pump 10020. The direct drive link 10006 is a shaft, but it is understood that the direct drive link 10006 may be a gear, a plurality of gears, or another type of mechanical connection.

The third transmission portion 10016 is a clutching arrangement drivingly engaged with the direct drive link 10006 and the first transmission portion 8010. The third transmission portion 10016 includes a fourth engagement device 10042 and a seventh drive ratio 10044. By engaging the fourth engagement device 10042, the second transmission portion 10014 is drivingly engaged with the direct drive link 10006 through the seventh drive ratio 10044 and the second drive ratio 10028. The fourth engagement device 10042 is a clutch which may be variably engaged; however, it is understood that other types of engagement devices may be used.

The auxiliary pump 10020 is a fixed displacement hydraulic pump. However, it is understood the auxiliary pump 10020 may be any other type of hydraulic pump. The auxiliary pump 10020 is drivingly engaged with the power source 10002 through the first hydrostatic pump 10004 and the direct drive link 1006. The auxiliary pump 10020 may be in fluid communication with the hydrostatic motor 10008 through at least two fluid conduits 10046 or the auxiliary pump 10020 may be in fluid communication with an auxiliary circuit (not shown).

In use, the hydrostatic driveline 10000 may be operated in the hydrostatic mode or the direct drive mode. In either of the drive modes, one of the engagement devices 10022, 10032, 10042 are engaged at any given instant. In the hydrostatic mode, the hydrostatic driveline 10000 is operated at lower speeds using the first drive ratio 10026, the third drive ratio 10030, and the fifth drive ratio 10036 by engaging the first engagement device 10022. Further, the hydrostatic driveline 10000 may be operated in the hydrostatic mode using the first drive ratio 10026 and the fourth drive ratio 10034 by engaging the third engagement device 10032. By adjusting the swashplate angle of the hydrostatic pump 10004, the forward and the reverse direction is provided to the first drive ratio 10026 through the hydrostatic motor 10008. In the direct drive mode, the hydrostatic driveline 10000 is operated at higher speeds using the second drive ratio 10028 and the sixth drive ratio 10038. Further, the hydrostatic driveline 10000 may be operated in the direct drive mode using the second drive ratio 10028 and the third drive ratio 10030 by engaging the second engagement device 10024.

Figure 11:
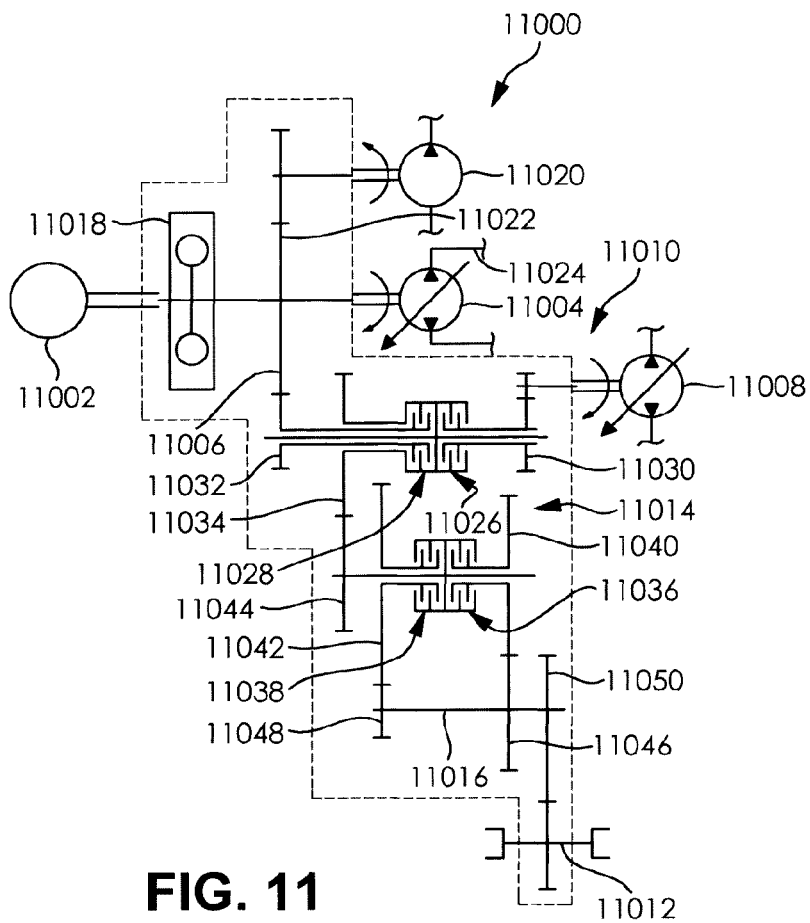
FIG. 11 is a schematic illustration of a hydrostatic driveline according to another embodiment of the present invention.
Figure 12:
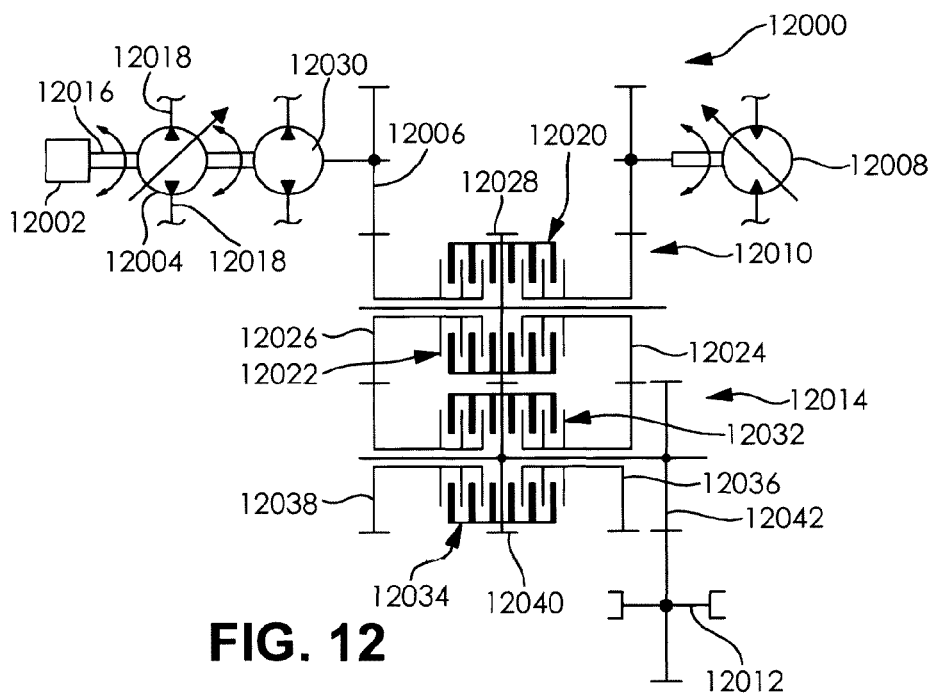
FIG. 12 is a schematic illustration of a hydrostatic driveline according to another embodiment of the present invention.

FIG. 11 illustrates a hydrostatic driveline 11000 according to another embodiment of the invention. The hydrostatic driveline 11000 includes a power source 11002 in driving engagement with a first hydrostatic pump 11004 through a direct drive link 11006. The first hydrostatic pump 11004 is in fluid communication with a hydrostatic motor 11008. The hydrostatic motor 11008 is in driving engagement with a first transmission portion 11010, which is in driving engagement with a vehicle output 11012 through a second transmission portion 11014 and a lay shaft 11016. The direct drive link 11006 is in driving engagement with the first transmission portion 11010, which is in driving engagement with a vehicle output 11012 through a second transmission portion 11014 and a lay shaft 11016. The hydrostatic driveline 11000 may be operated in a hydrostatic mode or a direct drive mode.

The power source 11002 applies power to the direct drive link 11006 of the hydrostatic driveline 1000. The power source 11002 is, for example, an internal combustion engine; however, it is understood that the power source 11002 may include an electric motor or another source of rotational output. It is understood that the power source 11002 may be a hybrid power source including both an internal combustion engine and an electric motor. As shown in FIG. 11, the power source 11002 includes a torque converter 11018, which is an optional component of the hydrostatic driveline 11000. Further, it is understood that the power source 11002 may include an output ratio adjusting device as known in the art. Further, it is understood that the power source 11002 may include an engagement device (not shown) as known in the art, for one of reducing and interrupting a rotational force transferred to the hydrostatic driveline 11000.

The direct drive link 11006 is a mechanical connection which facilitates driving engagement between the power source 11002 and the first hydrostatic pump 11004. The direct drive link 11006 is also in driving engagement with an auxiliary pump 11020 and the first transmission portion 11010. The direct drive link 11006 is a shaft having a geared portion 11022; however, the direct drive link 11006 may also be a shaft, a plurality of gears, or another type of mechanical connection.

The first hydrostatic pump 11004 is a hydraulic axial piston pump having a movable swashplate (not shown) which varies a displacement thereof. However, it is understood the first hydrostatic pump 11004 may be any other type of variable displacement pump. The first hydrostatic pump 11004 is drivingly engaged with the power source 11002 through the direct drive link 11006. The first hydrostatic pump 11004 is in fluid communication with the hydrostatic motor 1008 through at least two fluid conduits 11024. As the first hydrostatic pump 11004 is drivingly engaged with the power source 11002, a drive portion of the first hydrostatic pump 11004 always rotates in the same direction as the power source 11002. A direction of flow through the first hydrostatic pump 11004 is changed by adjusting a swashplate angle of the first hydrostatic pump 11004. By adjusting the swashplate angle of the first hydrostatic pump 11004, a forward and a reverse direction is provided when the hydrostatic driveline 11000 is operated in the hydrostatic mode.

The hydrostatic motor 11008 is a variable displacement hydraulic motor having a movable swashplate (not shown) which varies a displacement, and thus a rotational speed, thereof. However, it is understood the hydrostatic motor 11008 may be another type of hydraulic motor. The hydrostatic motor 11008 is drivingly engaged with the first transmission portion 11010. The hydrostatic motor 11008 is in fluid communication with the first hydrostatic pump 11004 through the at least two fluid conduits 11024.

The first transmission portion 11010 is a clutching arrangement drivingly engaged with the second transmission portion 11014, the direct drive link 11006, and the hydrostatic motor 11008. The first transmission portion 11010 is drivingly engaged with the vehicle output 11012 through the second transmission portion 11014 and the lay shaft 11016. The first transmission portion 11010 includes a first engagement device 11026, a second engagement device 11028, a first drive ratio 11030, a second drive ratio 11032, and a third drive ratio 11034. By engaging the first engagement device 11026, the hydrostatic motor 11008 is drivingly engaged with the first transmission portion 11010 through the first drive ratio 11030 and the third drive ratio 11034. The first engagement device 11026 is a clutch which may be variably engaged; however, it is understood that other types of engagement devices may be used. By engaging the second engagement device 11028, the second drive ratio 11032 is drivingly engaged with the third drive ratio 11034, facilitating driving engagement between the direct drive link 11006 and a portion of the second transmission portion 11014 through the second drive ratio 11032 and the third drive ratio 11034. The second engagement device 11028 is a clutch which may be variably engaged; however, it is understood that other types of engagement devices may be used.

The second transmission portion 11014 is a clutching arrangement drivingly engaged with the direct drive link 11006 and the vehicle output 11012 through the first transmission portion 11010 and the lay shaft 11016, respectively. The second transmission portion 11014 includes a third engagement device 11036, a fourth engagement device 11038, a fourth drive ratio 11040, a fifth drive ratio 11042, and a sixth drive ratio 11044. By engaging the third engagement device 11036, the third drive ratio 11034 is placed in driving engagement with the vehicle output 11012 through the sixth drive ratio 11044 and the fourth drive ratio 11040. The third engagement device 11036 is a clutch which may be variably engaged; however, it is understood that other types of engagement devices may be used. By engaging the fourth engagement device 11038, the third drive ratio 11034 is placed in driving engagement with the vehicle output 11012 through the sixth drive ratio 11044 and the fifth drive ratio 11042. The fourth engagement device 11038 is a clutch which may be variably engaged; however, it is understood that other types of engagement devices may be used.

The lay shaft 11016 is a mechanical connection in driving engagement with the fourth drive ratio 11040, the fifth drive ratio 11042, and the vehicle output 11012. The lay shaft 11016 is a rotatably mounted shaft, but it is understood that the lay shaft 11016 may be a gear, a plurality of gears, or another type of mechanical connection. A first portion 11046 of the lay shaft 11016 is in driving engagement with the fourth drive ratio 11040 through a plurality of gear teeth. A second portion 11048 of the lay shaft 11016 is in driving engagement with the fifth drive ratio 11042 through a plurality of gear teeth. A third portion 11050 of the lay shaft 11016 is in driving engagement with the vehicle output 11012 through a plurality of gear teeth. The auxiliary pump 11020 is in driving engagement with the direct drive link 11006. The auxiliary pump 11020 is a fixed displacement hydraulic pump. However, it is understood the auxiliary pump 11020 may be another type of hydraulic pump. The auxiliary pump 11020 may be in fluid communication with the hydrostatic motor 11008 or an auxiliary device (not shown).

In use, the hydrostatic driveline 11000 may be operated in the hydrostatic mode or the direct drive mode. In either of the drive modes, only one of the engagement devices 11026, 11028 may be fully engaged at any given instant. In the hydrostatic mode, the first engagement device 11026 is engaged and the hydrostatic driveline 11000 is operated at lower speeds by driving the vehicle output 11012 through either the third engagement device 11036 and the fourth drive ratio 11040 or the fourth engagement device 11038 and the fifth drive ratio 11042. As mentioned hereinabove, by adjusting the swashplate angle of the hydrostatic pump 11004, the forward and the reverse direction is provided to the vehicle output 11012, through the lay shaft 11016 and one of the engagement devices 11036, 11038. In the direct drive mode, the second engagement device 11028 is engaged and the hydrostatic driveline 11000 is operated at higher by driving the vehicle output 11012 through either the third engagement device 11036 and the fourth drive ratio 11040 or the fourth engagement device 11038 and the fifth drive ratio 11042. The drive ratios 11040, 11042 of the second transmission portion 11014 are configured as two different drive speeds, and may be used in either the hydrostatic mode or the direct drive mode. Further, it is understood that a reverse drive option may be added to the direct drive mode of the hydrostatic driveline 11000 through the addition of further components, such as an additional gear, to the hydrostatic driveline 1000.

FIG. 1 illustrates a hydrostatic driveline 12000. The hydrostatic driveline 12000 includes a power source 12002 in driving engagement with a first hydrostatic pump 12004 and a direct drive link 12006. The first hydrostatic pump 12004 is in fluid communication with a hydrostatic motor 12008. The hydrostatic motor 12008 is in driving engagement with a first transmission portion 12010, which is in driving engagement with a vehicle output 12012 through a second transmission portion 12014. The direct drive link 12006 is also in driving engagement with a first transmission portion 12010. The hydrostatic driveline 12000 may be operated in a hydrostatic mode or a direct drive mode.

The power source 12002 applies power to an input 12016 of the hydrostatic driveline 12000. The power source 12002 is, for example, an internal combustion engine; however, it is understood that the power source 12002 may include an electric motor or another source of rotational output. It is understood that the power source 12002 may be a hybrid power source including both an internal combustion engine and an electric motor. Further, it is understood that the power source 12002 may include an output ratio adjusting device as known in the art. Further, it is understood that the power source 12002 may include an engagement device (not shown) as known in the art, for one of reducing and interrupting a rotational force transferred to the hydrostatic driveline 12000.

The input 12016 is in driving engagement with the power source 12002 and the first hydrostatic pump 12004. The input 12016 may be a gear, a plurality of gears, a shaft, or another type of mechanical connection.

The first hydrostatic pump 12004 is a hydraulic axial piston pump having a movable swashplate (not shown) which varies a displacement thereof. However, it is understood the first hydrostatic pump 12004 may be any other type of variable displacement pump. As mentioned hereinabove, the first hydrostatic pump 12004 is drivingly engaged with the power source 12002 through the input 12016. The first hydrostatic pump 12004 is in fluid communication with the hydrostatic motor 12008 through at least two fluid conduits 12018. As the first hydrostatic pump 12004 is drivingly engaged with the power source 12002, a drive portion of the first hydrostatic pump 12004 always rotates in the same direction as the power source 12002. A direction of flow through the first hydrostatic pump 12004 is changed by adjusting a swashplate angle of the first hydrostatic pump 12004. By adjusting the swashplate angle of the first hydrostatic pump 12004, a forward and a reverse direction is provided when the hydrostatic driveline 12000 is operated in the hydrostatic mode.

The hydrostatic motor 12008 is a variable displacement hydraulic motor having a movable swashplate (not shown) which varies a displacement, and thus a rotational speed, thereof. However, it is understood the hydrostatic motor 12008 may be another type of hydraulic motor. The hydrostatic motor 12008 is drivingly engaged with the first transmission portion 12010. The hydrostatic motor 12008 is in fluid communication with the first hydrostatic pump 12004 through the at least two fluid conduits 12018.

The first transmission portion 12010 is a clutching arrangement drivingly engaged with the hydrostatic motor 12008, the direct drive link 12006, and the second transmission portion 12014. The first transmission portion 12010 is also drivingly engaged with the vehicle output 12012 through a portion of the second transmission portion 12014. The first transmission portion 12010 includes a first engagement device 12020, a second engagement device 12022, a first drive ratio 12024, a second drive ratio 12026, and a third drive ratio 12028. By engaging the first engagement device 12020, the hydrostatic motor 12008 is drivingly engaged with the vehicle output 12012 through the first drive ratio 12024, the third drive ratio 12028, and the second transmission portion 12014. The first engagement device 12020 is a clutch which may be variably engaged; however, it is understood that other types of engagement devices may be used. By engaging the second engagement device 12022, the direct drive link 12006 is drivingly engaged with the vehicle output 12012 through the second drive ratio 12026, the third drive ratio 12028, and the second transmission portion 12014. The second engagement device 12022 is a clutch which may be variably engaged; however, it is understood that other types of engagement devices may be used.

The direct drive link 12006 is a mechanical connection which facilitates driving engagement between the power source 12002 and the first transmission portion 12010, through the first hydrostatic pump 12004 and an auxiliary pump 12030.

The second transmission portion 12014 is a clutching arrangement drivingly engaged with the first transmission portion 12010 and the vehicle output 12012. The second transmission portion 12014 includes a third engagement device 12032, a fourth engagement device 12034, a fourth drive ratio 12036, a fifth drive ratio 12038, and a sixth drive ratio 12040. By engaging one of the engagement devices 12032, 12034, the drive ratios 12036, 12038 are respectively drivingly engaged with the drive ratios 12024, 12026. The engagement devices 12032, 12034 are clutches which may be variably engaged; however, it is understood that other types of engagement devices may be used. The sixth drive ratio 12040 is drivingly engaged with the third drive ratio 12028. A geared portion 12042 of the second transmission portion 12014 is drivingly engaged with the vehicle output 12012.

The auxiliary pump 12030 is a fixed displacement hydraulic pump. However, it is understood the auxiliary pump 12030 may be any other type of hydraulic pump. As mentioned hereinabove, the auxiliary pump 12030 is drivingly engaged with the power source 12002 through the first hydrostatic pump 12004. The auxiliary pump 12030 may be in fluid communication with the hydrostatic motor 12008 or the The auxiliary pump 12030 may be in fluid communication with an auxiliary circuit (not shown).

In use, the hydrostatic driveline 12000 may be operated in the hydrostatic mode or the direct drive mode. In either of the drive modes, only one of the engagement devices 12020, 12022, 12032, 12034 may be fully engaged at any given instant. In the hydrostatic mode, the hydrostatic driveline 12000 is operated at lower speeds using either the fourth drive ratio 12036 driven through the first drive ratio 12024 when the third engagement device 12032 is engaged or the sixth drive ratio 12040 driven through the third drive ratio 12028 when the first engagement device 12020 is engaged. As mentioned hereinabove, by adjusting the swashplate angle of the hydrostatic pump 12004, the forward and the reverse direction is provided to the vehicle output 12012. In the direct drive mode, the hydrostatic driveline 1000 is operated at higher speeds using either the fifth drive ratio 12038 driven through the second drive ratio 12026 when the fourth engagement device 12034 is engaged or the sixth drive ratio 12040 driven through the third drive ratio 12028 when the second engagement device 12022 is engaged. Further, it is understood that a reverse drive option may be added to the direct drive mode of the hydrostatic driveline 12000 through the addition of further components, such as an additional gear, to the hydrostatic driveline 12000.

Figure 13:
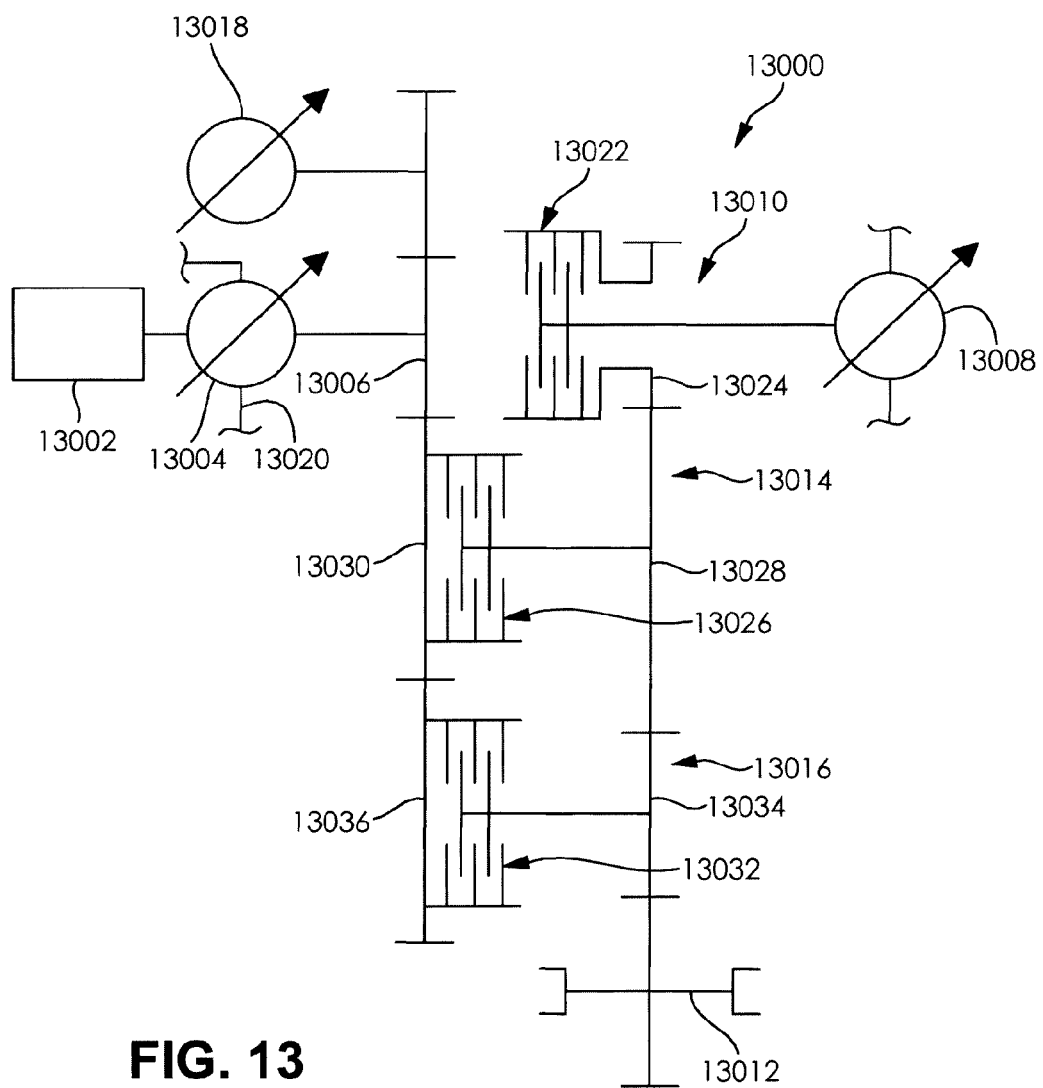
FIG. 13 is a schematic illustration of a hydrostatic driveline according to another embodiment of the present invention.

FIG. 13 illustrates a hydrostatic driveline 13000 according to another embodiment of the invention. The hydrostatic driveline 13000 includes a power source 13002 in driving engagement with a first hydrostatic pump 13004 and a direct drive link 13006. The first hydrostatic pump 13004 is in fluid communication with a hydrostatic motor 13008. The hydrostatic motor 13008 is in driving engagement with a first transmission portion 13010, which is in driving engagement with a vehicle output 13012 through a second transmission portion 13014 and a third transmission portion 13016. The direct drive link 13006 is in driving engagement with the second transmission portion 13014 and an auxiliary pump 13018. The hydrostatic driveline 13000 may be operated in a hydrostatic mode or a direct drive mode.

The power source 13002 applies power to the first hydrostatic pump 13004 of the hydrostatic driveline 13000. The power source 13002 is, for example, an internal combustion engine; however, it is understood that the power source 13002 may include an electric motor or another source of rotational output. It is understood that the power source 13002 may be a hybrid power source including both an internal combustion engine and an electric motor. Further, it is understood that the power source 13002 may include an output ratio adjusting device as known in the art. Further, it is understood that the power source 13002 may include an engagement device (not shown) as known in the art, for one of reducing and interrupting a rotational force transferred to the hydrostatic driveline 13000.

The first hydrostatic pump 13004 is a hydraulic axial piston pump having a movable swashplate (not shown) which varies a displacement thereof. However, it is understood the first hydrostatic pump 13004 may be any other type of variable displacement pump. As mentioned hereinabove, the first hydrostatic pump 13004 is drivingly engaged with the power source 13002 and the direct drive link 13006. The first hydrostatic pump 13004 is in fluid communication with the hydrostatic motor 13008 through at least two fluid conduits 13020. As the first hydrostatic pump 13004 is drivingly engaged with the power source 13002, a drive portion of the first hydrostatic pump 13004 always rotates in the same direction as the power source 13002. A direction of flow through the first hydrostatic pump 13004 is changed by adjusting a swashplate angle of the first hydrostatic pump 13004. By adjusting the swashplate angle of the first hydrostatic pump 13004, a forward and a reverse direction is provided when the hydrostatic driveline 13000 is operated in the hydrostatic mode.

The hydrostatic motor 13008 is a variable displacement hydraulic motor having a movable swashplate (not shown) which varies a displacement, and thus a rotational speed, thereof. However, it is understood the hydrostatic motor 13008 may be another type of hydraulic motor. The hydrostatic motor 13008 is drivingly engaged with the first transmission portion 13010. The hydrostatic motor 13008 is in fluid communication with the first hydrostatic pump 13004 through the at least two fluid conduits 13020.

The first transmission portion 13010 is a clutching arrangement drivingly engaged with the hydrostatic motor 13008 and the second transmission portion 13014. The first transmission portion 13010 includes a first engagement device 13022 and a first drive ratio 13024. By engaging the first engagement device 13022, the first transmission portion 13010 is drivingly engaged with a portion of the second transmission portion 13014 through the first drive ratio 13024. The first engagement device 13022 is a clutch which may be variably engaged; however, it is understood that other types of engagement devices may be used.

The second transmission portion 13014 is a clutching arrangement drivingly engaged with the first transmission portion 13010, the direct drive link 13006, and the third transmission portion 13016. The second transmission portion 13014 includes a second engagement device 13026, a second drive ratio 13028, and a third drive ratio 13030. By engaging the second engagement device 13026, the third drive ratio 13030 of the second transmission portion 13014 is drivingly engaged with the vehicle output 13012 through the second drive ratio 13028 and the third transmission portion 13016. The second engagement device 13026 is a clutch which may be variably engaged; however, it is understood that other types of engagement devices may be used.

The third transmission portion 13016 is a clutching arrangement drivingly engaged with the second transmission portion 13014 and the vehicle output 13012. The third transmission portion 13016 includes a third engagement device 13032, a fourth drive ratio 13034, and a fifth drive ratio 13036. By engaging the third engagement device 13032, the fifth drive ratio 13036 of the third transmission portion 13016 is drivingly engaged with the vehicle output 13012 through the fourth drive ratio 13034. The third engagement device 13032 is a clutch which may be variably engaged; however, it is understood that other types of engagement devices may be used.

The direct drive link 13006 is a mechanical connection which facilitates driving engagement between the first hydrostatic pump 10004 and the second transmission portion 13014. The direct drive link 13006 is a geared shaft, but it is understood that the direct drive link 13006 may be a gear, a plurality of gears, or another type of mechanical connection.

The auxiliary pump 13018 is a fixed displacement hydraulic pump. However, it is understood the auxiliary pump 13018 may be any other type of hydraulic pump. The auxiliary pump 13018 is drivingly engaged with the power source 13002 through the first hydrostatic pump 13004 and the direct drive link 13006. The auxiliary pump 13018 may be in fluid communication with the hydrostatic motor 13008 or the auxiliary pump 13018 may be in fluid communication with an auxiliary circuit (not shown).

In use, the hydrostatic driveline 13000 may be operated in the hydrostatic mode or the direct drive mode. In either of the drive modes, one of the engagement devices 13022, 13026, 13032 are engaged at any given instant. In the hydrostatic mode, the hydrostatic driveline 13000 is operated at lower speeds using the first drive ratio 13024, the second drive ratio 13028, and the fourth drive ratio 13034 by engaging the first engagement device 13022. By adjusting the swashplate angle of the hydrostatic pump 13004, the forward and the reverse direction is provided to the vehicle output 13012 through the hydrostatic motor 13008. In the direct drive mode, the hydrostatic driveline 13000 is operated at higher speeds using the third drive ratio 13030, the second drive ratio 13028, and the fourth drive ratio 13034 by engaging the second engagement device 13026. Further, the hydrostatic driveline 13000 may also be operated in the direct drive mode using the fifth drive ratio 13036 and the fourth drive ratio 13034 by engaging the third engagement device 13032.

In addition to the above described hydrostatic driveline layouts, the present invention also concerns multi-path friction clutches, such as the engagement devices described hereinabove, for torque modulation.

Friction clutches are well-known devices for transmitting torque from one rotating shaft to another, including when the two shafts are rotating at different speeds. Powershifting friction clutches, which they are commonly referred to in the art, are used to transmit torque from a transmission input to more than one speed ratio at the transmission output, without requiring an interruption of the torque being transmitted from an input to an output. A non-limiting example of changing a speed ratio without interrupting torque would be an automatic transmission in a passenger automobile, which changes speed ratio as the vehicle increases speed without the interruption of driving torque. This behavior may be contrasted with the operation of a manual transmission in a passenger automobile, which must interrupt driving torque to shift between gear ratios.

The technique of powershifting begins with a first powerpath and speed ratio engaged with one friction clutch, while a second powerpath and speed ratio is available through a second friction clutch, which is disengaged. The second friction clutch is then engaged at a low torque level, and begins to transmit torque from the power source to the output through the second powerpath and speed ratio, while the first friction clutch is also transmitting torque from the power source through the first speed ratio to the output. By appropriately decreasing torque from the first friction clutch, and at the same time appropriately increasing torque from the second friction clutch, torque can be continuously transmitted from power source to the output, while the speed ratio from power source to the output is being changed from the value in the first powerpath to the value in the second powerpath. During the transition, both clutches are transmitting torque across slipping friction surfaces, so the clutch torque value is a function of the pressure applied to the friction interface (and the friction coefficient).

Continuously Variable Transmissions (CVTs) also transmit torque from a power source at the input to more than one speed ratio at the output, but they normally do this by changing the geometry of the rotational contact points in the transmission, as to minimize the power losses from transmitting torque across rotating speed differences. Variable displacement hydrostatic pumps and motors may also be used to create continuously variable speed ratios while transmitting torque from input to output. The variable displacement feature avoids friction losses by exchanging hydraulic fluid pressures and flows to create different combinations of torque and speed.

It is understood that the present invention is not limited to the conventional approaches of "hydrodynamic transmissions" with powershifting clutches and torque converters (including one-way clutches on stator and lock-up clutches for efficiency), and "hydrostatic transmissions" with one or more variable-displacement hydrostatic pump and motor combinations.

The present invention also comprises accurate, closed-loop torque control of the individual powershifting clutches, which allows a supervisory controller to adjust clutch engagement behavior to suit the targeted system behavior. In-service learning of the vehicle characteristics allows the controller to specify a desired behavior of the transmission input and output, taking into consideration the objectives of engaging and disengaging the clutches as short a time as possible, and at the lowest practical torque.

Shifting control of hydrostatic transmissions requires a higher level of vehicle system characterization and control, so that engine torque and hydrostatic transmission speed ratio are additional control variables, and the torques and speeds at all interface points are important to control. The result of this model-based system-level control is that the powershifting clutches are held in an appropriate state of slipping friction, with the clutch torque managed to suit the system objectives until the transient is complete and the clutches are fully engaged or disengaged.

The present invention has been developed to be able to operate synchronous engagements and disengagements of the hydrostatic pump and motor, but also with individual clutch engagement torques and engine power management through an override function available on a vehicle data bus.

The present invention also comprises the use of a two speed axle. By moving the function of one ratio change from the transmission to the axle, the remaining functions have more space, and the portion of the transmission that had large gear reductions can be reduced in capacity. The two speed axle approach provides the ratio change that makes this possible.

By coordinating the axle shifting and the transmission shifting under one control structure, the vehicle operation can be managed according to an intention of the operator, and the components can be operated in the manner that best utilizes their properties. Thus for example, a torque-interrupt axle shift could be suppressed if an infinitely variable transmission function of the transmission is in heavy use, but allowed if vehicle parameters indicate that the vehicle is being driven on level ground from one site to another.

Further, the anticipation of a particularly difficult set of conditions for a hydrostatic to hydrostatic shift could prompt an early ratio change to avoid demanding operation of components.

The present invention also comprises the use of a dog clutch, a synchronizer, and a low energy friction clutch for use with hydrostatic clutches. Further, "shift on fly" technology, which quickly synchronizes and engages a dog clutch for connecting a new hydrostatic ratio (even if the hydrostatic control has not had time to reach synchronous speed) may also be incorporated into the present invention. The demands of shifting ratios on a hydrostatic and direct transmission have caused many different combinations of components to be considered, even though documentation usually shows friction clutches for engagement and disengagement. The present invention also comprises the use of friction clutches with low thermal capacity in some applications of the hydrostatic transmission with direct drive, because the arrangements allow synchronization by other devices, then friction engagement simply to transmit torque.

The present invention also comprises the use of system identification algorithms to characterize the different dynamic behaviors of the powertrain, depending on gear ratio, vehicle weight, road grade, and rolling resistance. In the system-level control of components (sub-system control during transients, shift decisions, performance calibrations, etc) the ability to extract information from characteristics of the driveline is critical, especially if it can be obtained from existing sensors, such as speed and pressure sensors.

The present invention also comprises the use of a mechanical continuously and infinitely variable transmissions for direct bypass and multiple-ratio schemes to provide the benefits of improved speed range, higher efficiency, or multiple power paths. Further, mechanical continuously and infinitely variable transmission do not have much compliance or ability to slip, so minor speed differences are much more important to these devices than they are to hydrodynamic devices or systems with compliant components.

The present invention also comprises the use of system identification algorithms for use with the mechanical continuously and infinitely variable transmissions to characterize the different dynamic behaviors of the powertrain, depending on a gear ratio, a vehicle weight, a road grade, and a rolling resistance. In the system-level control of components (sub-system control during transients, shift decisions, performance calibrations, for example) the ability to extract information from characteristics of the driveline is critical, especially if it can be obtained from existing sensors such as speed and pressure sensors.

The present invention also comprises use of such concepts in a hydraulic hybrid drivetrain. The hydraulic hybrids drivetrain uses energy in the form of hydraulic pressure and flow to improve operation of the vehicle, particularly in improving fuel economy and peak power.

Since the hydraulic hybrid drivetrain operates by controlling hydrostatic power, there are many interactions that can be considered with the hydrostatic drivetrain, or even the hydrostatic system that operates auxiliary loads. Any time that the inefficiency of hydrostatics can be improved by switching to a direct gear path, or by changing the ratio and moving the engine or the hydrostatic device to a more efficient operating point, then the principles of this disclosure could be used. The same perspective of system-level control that is implemented in the hydraulic hybrid drivetrain can be used to manage components of the hydrostatic drive with direct feature, and the combinations may be novel. For instance, once the hydrostatic drive has the ability to manipulate the components to ensure smooth ratio transitions or single as opposed to two motors, then it is a simple matter to produce excess hydrostatic pressure and flow beyond what is needed for the driveline, if the hydraulic hybrid drivetrain determines that it would be desirable from a system-level perspective.

A direct drive hydrostatic transmission according to an embodiment of the present invention may be operated in a low speed mode of operation and a high speed mode of operation. In the low speed mode of operation, the direct drive hydrostatic transmission operates in a fully hydrostatic, continuously variable manner. In the high speed mode of operation, the direct drive hydrostatic transmission operates in a direct drive manner using a transmission having a plurality of gears. The high speed mode of operation may be used for moving the vehicle at a high rate of speed and allows the direct drive hydrostatic transmission to operate at a high efficiency. The low speed mode of operation may be used for operating the vehicle at a low rate of speed (such as in a working mode) and allows the direct drive hydrostatic transmission to be operated in a continuously variable manner. The low speed mode of operation may also be used for a shuttling function and a reverse speed mode. The direct drive hydrostatic transmission employs a fewer number of clutches than a powershift transmission reduces a speed difference between portions of each of the clutches to greatly reduce an amount of drag torque. As a non-limiting example, the direct drive hydrostatic transmission allows a speed range of about 18-20 Km/h speed in the low speed mode of operation and a speed range of about 20 to 40 Km/h in the high speed mode of operation.

Figure 14:
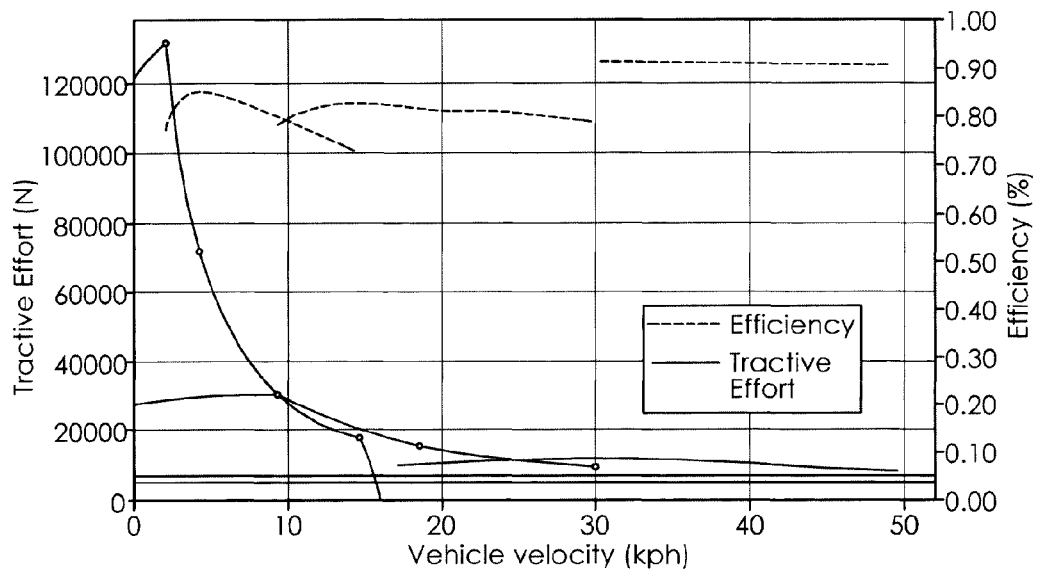
FIG. 14 is a chart illustrating an exemplary efficiency and a tractive effort as a function of a velocity of a vehicle incorporating the hydrostatic driveline shown in FIGS. 4 and 9.

FIG. 14 is a chart illustrating an exemplary efficiency and a tractive effort as a function of a velocity of a vehicle incorporating the hydrostatic driveline shown in FIGS. 4 and 9.

Figure 15:
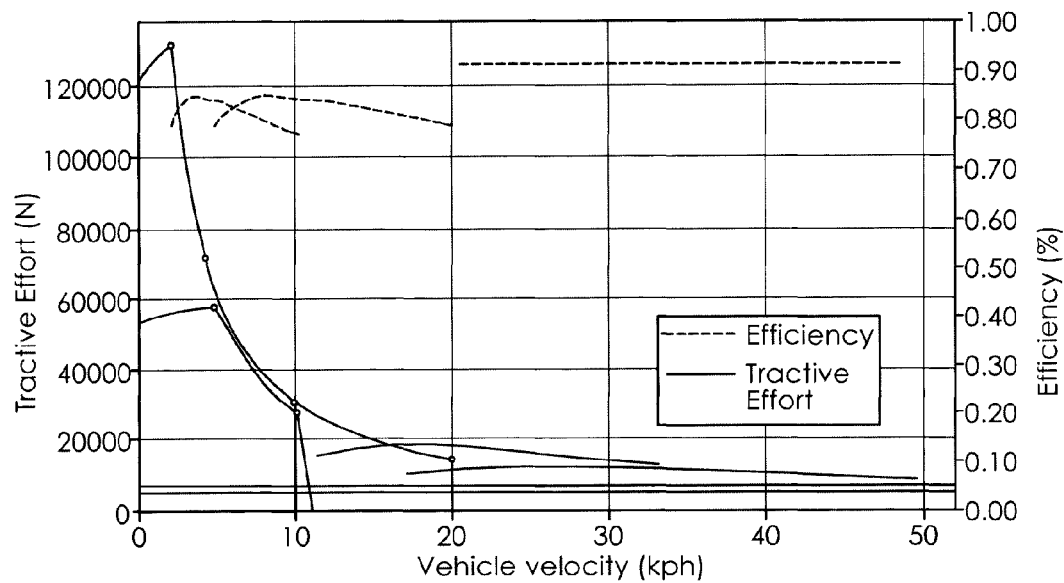
FIG. 15 is a chart illustrating an exemplary efficiency and a tractive effort as a function of a velocity of a vehicle incorporating the hydrostatic driveline shown in FIGS. 7, 8, 10, 11, and 12.

FIG. 15 is a chart illustrating an exemplary efficiency and a tractive effort as a function of a velocity of a vehicle incorporating the hydrostatic driveline shown in FIGS. 7, 8, 10, 11, and 12.

Figure 16:
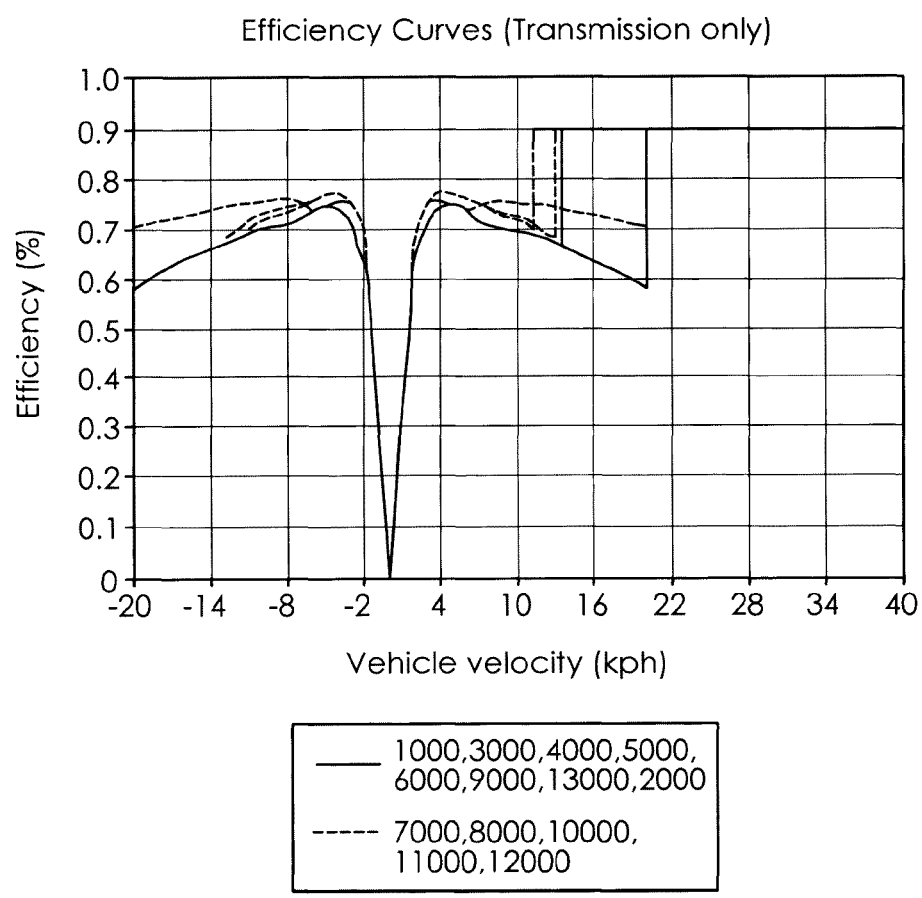
FIG. 16 is a chart illustrating an exemplary efficiency as a function of a velocity of a vehicle incorporating the hydrostatic driveline shown in FIGS. 1, 2, 3, 4, 5, 6, 7, 8, 9, 10, 11, 12, and 13.

FIG. 16 is a chart illustrating an exemplary efficiency as a function of a velocity of a vehicle incorporating the hydrostatic driveline shown in FIGS. 1, 2, 3, 4, 5, 6, 7, 8, 9, 10, 11, 12, and 13.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A hydrostatic driveline, comprising:
   a power source;
   a hydrostatic pump in driving engagement with the power source;
   a hydrostatic motor in fluid communication with the hydrostatic pump;
   a direct drive link in driving engagement with at least one of the power source and the hydrostatic pump;
   a first transmission portion in driving engagement with a vehicle output and the hydrostatic motor, wherein the first transmission portion includes a first engagement device and a first drive ratio, wherein the hydrostatic motor is configured to be drivingly engaged with the vehicle output through the first drive ratio by engaging the first engagement device; and
   a second transmission portion in driving engagement with the direct drive link and at least one of the vehicle output and the first transmission portion, wherein the second transmission portion includes a second engagement device, a third engagement device, a second drive ratio, and a third drive ratio, wherein the second transmission portion is configured to be drivingly engaged with the vehicle output through the second drive ratio by engaging the second engagement device, and wherein the second transmission portion is configured to be drivingly engaged with the vehicle output through the third drive ratio by engaging the third engagement device;
   wherein
   a) the first transmission portion is drivingly engaged with the vehicle output through a portion of the second transmission portion, or
   b) the second transmission portion is drivingly engaged with the vehicle output through the first transmission portion;
   wherein the hydrostatic driveline is configured to be operated in a hydrostatic mode using a first power path including the hydrostatic pump, the hydrostatic motor, and the first transmission portion, by engaging the first engagement device, and by disengaging the second engagement device and the third engagement device; and
   wherein the hydrostatic driveline is configured to be operated in a direct drive mode using a second power path including the direct drive link and the second transmission portion, by engaging only one of the second engagement device and the third engagement device, and by disengaging the first engagement device.

2. The hydrostatic driveline according to claim 1, wherein the first transmission portion includes at least two engagement devices and two drive ratios.

3. The hydrostatic driveline according to claim 1, wherein the first transmission portion and the second transmission portion include at least four engagement devices and four drive ratios.

4. The hydrostatic driveline according to claim 1, wherein at least one engagement device and a drive ratio forms a portion of both the first power path and the second power path.

5. The hydrostatic driveline according to claim 1, wherein at least two engagement devices and two drive ratios forms a portion of both the first power path and the second power path.

6. The hydrostatic driveline according to claim 2, wherein at least one of the drive ratios is both a forward drive gear and a reverse drive gear.

7. The hydrostatic driveline according to claim 1, further comprising a second hydrostatic pump, the second hydrostatic pump in driving engagement with the direct drive link.

8. The hydrostatic driveline according to claim 1, further comprising a power take off, the power take off in driving engagement with the direct drive link.

9. The hydrostatic driveline according to claim 1, wherein the hydrostatic pump is a variable displacement hydrostatic pump and the hydrostatic motor is a fixed displacement hydrostatic motor.

10. The hydrostatic driveline according to claim 1, further comprising a lay shaft, the lay shaft in driving engagement with at least one of the first transmission portion and the second transmission portion and the vehicle output.

11. The hydrostatic driveline according to claim 1, wherein the vehicle output comprises a first portion drivingly engaged with the first transmission portion and a second portion drivingly engaged with the second transmission portion.

* * * * *